United States Patent
Uchida et al.

(10) Patent No.: US 8,660,772 B2
(45) Date of Patent: Feb. 25, 2014

(54) LIQUID CONCENTRATION MEASURING DEVICE

(75) Inventors: Akikazu Uchida, Obu (JP); Jun Tarui, Kariya (JP); Toshiki Annoura, Nagoya (JP); Hiroshi Katsurahara, Anjo (JP)

(73) Assignee: Denso Corporation, Kariya (JP)

( * ) Notice: Subject to any disclaimer, the term of this patent is extended or adjusted under 35 U.S.C. 154(b) by 980 days.

(21) Appl. No.: 12/764,284

(22) Filed: Apr. 21, 2010

(65) Prior Publication Data

US 2010/0263647 A1 Oct. 21, 2010

(30) Foreign Application Priority Data

Apr. 21, 2009 (JP) .................................. 2009-103104

(51) Int. Cl.
| | |
|---|---|
| *B60T 7/12* | (2006.01) |
| *G05D 1/00* | (2006.01) |
| *G06F 7/00* | (2006.01) |
| *G06F 17/00* | (2006.01) |
| *F02M 51/00* | (2006.01) |
| *F02B 13/00* | (2006.01) |

(52) U.S. Cl.
USPC .......................... 701/103; 123/494; 123/575

(58) Field of Classification Search
USPC ......... 123/1 A, 295, 299, 304, 575, 704, 300, 123/494; 701/101, 102, 103, 104, 105, 111, 701/113, 114, 115; 73/61.41
See application file for complete search history.

(56) References Cited

U.S. PATENT DOCUMENTS

| | | | | |
|---|---|---|---|---|
| 5,367,264 | A  * | 11/1994 | Brabetz ......................... | 324/674 |
| 8,248,087 | B2 * | 8/2012 | Ishino et al. .................. | 324/693 |
| 8,264,243 | B2 * | 9/2012 | Tarui et al. .................... | 324/663 |
| 8,566,004 | B2 * | 10/2013 | Annoura ....................... | 701/103 |

FOREIGN PATENT DOCUMENTS

| | | |
|---|---|---|
| JP | H1-166742 | 11/1989 |
| JP | 02-086937 | 3/1990 |
| JP | 06-003313 | 1/1994 |
| JP | 2006-322401 | 11/2006 |

* cited by examiner

*Primary Examiner* — Stephen K Cronin
*Assistant Examiner* — Sizo Vilakazi
(74) *Attorney, Agent, or Firm* — Nixon & Vanderhye PC

(57) ABSTRACT

A microcomputer of an alcohol concentration sensor reads a first measurement value corresponding to a first frequency and reads a second measurement value corresponding to a second frequency. The microcomputer calculates a difference between the first and second measurement values. The microcomputer performs stuck failure abnormality determination when a state where the difference between the measurement values is equal to or smaller than a predetermined value continues. The microcomputer outputs a PWM signal of a specific frequency, which is different from a frequency in a case of a normality, to an engine ECU. Thus, a failure of the alcohol concentration sensor can be surely determined.

12 Claims, 18 Drawing Sheets

LIQUID CONCENTRATION MEASURING DEVICE

CROSS REFERENCE TO RELATED APPLICATION

This application is based on and incorporates herein by reference Japanese Patent Application No. 2009-103104 filed on Apr. 21, 2009.

BACKGROUND OF THE INVENTION

1. Field of the Invention

The present invention relates to a liquid concentration measuring device that measures an alcohol concentration and the like.

2. Description of Related Art

Recently, low-pollution alcohol blended gasoline has been attracting attention as fuel for an automobile. Such the mixed gasoline has the optimum air-fuel ratio different from that of fuel consisting of only gasoline. Therefore, it is important to measure a content of the alcohol in the mixed gasoline, i.e., an alcohol concentration, in order to perform fuel injection control to achieve the optimum air-fuel ratio for the mixed gasoline.

Conventionally, there has been proposed a control device of an engine that measures an alcohol concentration and that controls a fuel injection quantity (for example, refer to Patent document 1: Japanese patent application publication No. 2006-322401). Generally, the alcohol has volatility lower than that of the gasoline. Therefore, the fuel injection quantity is corrected to be increased as the alcohol concentration increases and as temperature of the alcohol blended gasoline decreases.

In order to accurately measure the alcohol concentration, it is desirable to use a physical constant having a comparatively high change ratio. Therefore, a capacitive alcohol concentration sensor that senses a change in a relative dielectric constant is proposed (for example, refer to Patent document 2: PCT international patent application Japanese translation No. H5-507561 and Patent document 3: Japanese patent application publication No. H6-3313).

There is a possibility that the alcohol concentration sensor causes a stuck failure abnormality, in which an output becomes a fixed value, due to an aging change and the like. If such the stuck failure abnormality occurs, a deviation arises between the optimum air-fuel ratio and the correction of the fuel injection quantity.

Therefore, there is proposed a diagnostic device that determines an abnormality by detecting a deviation of a correction value based on air-fuel ratio feedback (for example, refer to Patent document 4: Japanese examined patent application publication No. H6-94822). The diagnostic device can determine occurrence of the abnormality in a system of an internal combustion engine.

There is proposed another abnormality diagnostic device that determines an abnormality in an alcohol concentration sensor itself (for example, refer to Patent document 5: Japanese examined utility model application publication No. H6-614).

The diagnostic device described in Patent document 4 can determine the occurrence of the abnormality in the system of the internal combustion engine. However, the diagnostic device cannot determine a failure of the alcohol concentration sensor itself. It is because, when an abnormality occurs in the system of the internal combustion engine, the cause of the abnormality is not limited to the failure of the alcohol concentration sensor, but rather, there can be many kinds of causes of the abnormality such as a failure of an injector, a failure of an air-fuel ratio sensor, leakage of intake air in an intake system and a failure of a fuel pump. Originally, the correction value based on the air-fuel ratio feedback contains variations of parts and a variation of the engine. Therefore, it is difficult to correctly find the cause of the variation of the correction value. Therefore, even if the abnormality of the system is determined, there is a possibility that a time necessary to specify the failure lengthens when the failure is specified in a repair shop or the like. As a result, there is a concern that a service level for a user lowers.

The abnormality diagnostic device described in Patent document 5 detects the abnormality in the sensor by monitoring a change in a sensor output. Therefore, the device cannot handle the stuck failure abnormality, in which the output from the sensor becomes a fixed value.

SUMMARY OF THE INVENTION

It is an object of the present invention to surely determine a failure of a liquid concentration measuring device itself.

According to a first example aspect of the present invention, in a liquid concentration measuring device, detection electrodes are arranged to face each other. A plurality of switching sections switch charge and discharge of the detection electrodes. An operation signal outputting section outputs an operation signal for switching the switching sections. The operation signal outputting section is capable of outputting the operation signal of a first frequency for switching the switching section in a first cycle and the operation signal of a second frequency for switching the switching section in a second cycle. A measurement value outputting section outputs a voltage corresponding to a capacitance of the detection electrodes as a measurement value. The measurement value outputting section outputs a first measurement value due to the first frequency and a second measurement value due to the second frequency.

Specifically, according to the present invention, a failure determining section determines a failure based on both of the first measurement value and the second measurement value that are outputted. When the stuck failure abnormality occurs, the measurement value becomes a fixed value. However, even when the measurement value becomes the fixed value, whether the measurement value is abnormal or not cannot be determined if the measurement is performed at a single frequency. Therefore, according to the present invention, it is determined whether the measurement value is abnormal by comparing the first measurement value and the second measurement value corresponding to the two frequencies. With such the construction, the liquid concentration measuring device can surely determine the failure of the device itself.

According to a second example aspect of the present invention, the failure is determined based on a measurement difference between the first measurement value and the second measurement value. In the case of the stuck failure abnormality, the first and second measurement values become substantially the same and therefore the difference between the first and second measurement values approximates to zero. Therefore, the failure may be determined by determining whether the difference becomes smaller than a predetermined value (i.e., whether difference approximates to zero). With such the construction, the failure can be determined comparatively easily.

Regarding the setting of the predetermined value, according to a third example aspect of the present invention, it is determined that the failure has occurred when the measurement difference falls below a predetermined value that is equal to or smaller than the minimum of the difference between the measurement values capable of appearing in a case of a normality. In the case of the normality, the difference between the first measurement value and the second measurement value exists within a certain range, although not uniformly. Therefore, it may be determined that the failure has occurred when the difference between the measurement values decreases to such a degree that the difference deviates from the certain range. That is, it may be determined that the failure has occurred when it is determined that the difference falls below the predetermined value set to be equal to or smaller than the difference capable of appearing in the case of the normality.

When the fuel is inferior, a leakage resistance in the detection electrodes becomes relatively small. If the leakage resistance decreases, a measurement error of the liquid concentration increases.

Regarding this point, the above-described construction that obtains the measurement difference between the first and second measurement values is effective. It is because, when the leakage resistance is denoted with Rp, a calculation formula of the voltage as the measurement value includes a constant term including (1/Rp). Therefore, in the case where the measurement is performed at the single frequency, if the leakage resistance Rp decreases, an influence of the decrease becomes comparatively large and the measurement value varies. As a countermeasure, by obtaining the difference between the two measurement values, the constant term including (1/Rp) can be removed, and the influence of the leakage resistance can be eliminated.

In the above-described construction, the difference between the first measurement value and the second measurement value is obtained. However, a construction for determining the failure is not limited to the above-described construction. Alternatively, for example, a ratio between the first measurement value and the second measurement value may be calculated.

In the case where such the liquid concentration measuring device is mounted in a vehicle, generally, the failure is determined on an engine control device side.

Therefore, according to a fourth example aspect of the present invention, the liquid concentration measuring device further has a concentration equivalent value outputting section for outputting a concentration equivalent value indicating a concentration of a liquid based on the first measurement value and the second measurement value. The concentration equivalent value outputting section outputs a failure value, which indicates the occurrence of the failure, in place of the concentration equivalent value when the failure determining section determines that the failure has occurred.

The concentration equivalent value may be a PWM signal of a frequency corresponding to the concentration, for example. In this case, when it is determined that the failure has occurred, a PWM signal of a specific frequency deviating from the frequency corresponding to the concentration may be outputted, for example. With such the construction, the failure of the liquid concentration measuring device can be easily determined on the engine control device side.

In this way, when focusing on the relationship with the engine control device, the present invention can be realized also as an engine control system including the engine control device.

That is, according to a fifth example aspect of the present invention, an engine control system has a liquid concentration measuring device and an engine control device. The liquid concentration measuring device includes at least detection electrodes arranged to face each other, a plurality of switching sections for switching charge and discharge of the detection electrodes, an operation signal outputting section capable of outputting an operation signal of a first frequency for switching the switching section in a first cycle and an operation signal of a second frequency for switching the switching section in a second cycle, a measurement value outputting section that is capable of outputting a voltage corresponding to a capacitance of the detection electrodes as a measurement value and that is capable of outputting a first measurement value due to the first frequency and a second measurement value due to the second frequency, a concentration equivalent value outputting section for outputting a concentration equivalent value indicating a concentration of a liquid based on the first measurement value and the second measurement value outputted by the measurement value outputting section, and a failure determining section for determining a failure based on both of the first measurement value and the second measurement value outputted by the measurement value outputting section. The engine control device includes at least an air-fuel ratio sensing section for measuring an air-fuel ratio of fuel, an injection quantity calculating section for calculating a fuel injection quantity based on an air-fuel ratio correction value calculated based on an output of the air-fuel ratio sensing section and the concentration equivalent value outputted by the concentration equivalent value outputting section, and an injection controlling section for performing fuel injection control based on the fuel injection quantity calculated by the injection quantity calculating section. The air-fuel ratio correction value is embodied as an air-fuel ratio feedback value, for example.

Also with such the engine control system, the failure of the liquid concentration measuring device itself can be surely determined like the above-described liquid concentration measuring device.

According to a sixth example aspect of the present invention, the failure is determined based on a measurement difference between the first measurement value and the second measurement value as in the liquid concentration measuring device described above.

According to a seventh example aspect of the present invention, it is determined that the failure has occurred when the measurement difference falls below a predetermined value that is equal to or smaller than the minimum of the difference between the measurement values capable of appearing in a case of a normality.

According to an eighth example aspect of the present invention, a failure value, which indicates the occurrence of the failure, is outputted in place of the concentration equivalent value when the failure determining section determines that the failure has occurred.

In the engine control device, the injection quantity calculating section calculates the fuel injection quantity based on the air-fuel ratio correction value.

Specifically, according to a ninth example aspect of the present invention, when an air-fuel ratio correction value calculated based on the output of the air-fuel ratio sensing section is outside an allowable range, an upper limit or a lower limit of the allowable range is set as the air-fuel ratio correction value. That is, guard (limitation) is applied to the air-fuel ratio correction value.

However, there is a possibility that inappropriate fuel injection quantity is calculated adversely by applying the guard to the air-fuel ratio correction value when the failure occurs in the liquid concentration measuring device. Therefore, according to the present invention, when the failure determining section determines that the failure has occurred, the allowable range is set to be wider than in a case of a normality. With such the construction, the guard similar to the case of the normality is not applied to the air-fuel ratio learning value. Thus, calculation of the inappropriate injection quantity can be avoided.

For example, according to a tenth example aspect of the present invention, the allowable range is set such that a value, which the air-fuel ratio correction value can take when the concentration equivalent value is assumed to be constant, is included in the allowable range when the failure determining section determines that the failure has occurred. With such the construction, the new allowable range can be set appropriately.

According to an eleventh example aspect of the present invention, the engine control device has an abnormality determining section for determining an abnormality in a fuel system based on deviation of an injection quantity correction value from a normal range. The injection quantity correction value includes an air-fuel ratio correction value calculated based on the output of the air-fuel ratio sensing section. The injection quantity correction value is constituted by an air-fuel ratio feedback value as the air-fuel ratio correction value and an air-fuel ratio learning value, for example. The air-fuel ratio learning value is the injection quantity correction value as of previous running and is stored when the engine is stopped.

However, if a failure occurs in the liquid concentration measuring device, the abnormality determination of the fuel system based on the injection quantity correction value becomes meaningless. Therefore, according to the present invention, when the failure determining section determines that the failure has occurred, the normal range is set to be wider than in a case of a normality. Thus, the abnormality determination of the fuel system can be avoided.

For example, according to a twelfth example aspect of the present invention, the normal range is set such that a value, which the injection quantity correction value can take when the concentration equivalent value is assumed to be constant, is included in the normal range when the failure determining section determines that the failure has occurred. With such the construction, the new normal range can be set appropriately.

In the above-explained construction, the liquid concentration measuring device has the failure determining section. Alternatively, the failure may be determined on the engine control device side.

According to a thirteenth example aspect of the present invention, a concentration equivalent value outputting section outputs a concentration equivalent value corresponding to a measurement difference between the first measurement value and the second measurement value and a correspondence relationship between the measurement difference and the concentration equivalent value. The correspondence relationship may be a map relating the measurement difference to a PWM frequency indicating the concentration. Specifically, the concentration equivalent value outputting section outputs the concentration equivalent value corresponding to the measurement difference based on the correspondence relationship even in a case of an abnormality, in which the measurement difference falls below the minimum of the difference between the measurement values capable of appearing in a case of a normality.

For example, when the correspondence relationship is the map relating the measurement difference to the PWM frequency indicating the concentration, according to a fourteenth example aspect of the present invention, the concentration equivalent value is outputted by performing extrapolation based on the correspondence relationship.

Thus, since the concentration equivalent value outputting section outputs the concentration equivalent value corresponding to the measurement difference even in the case of the abnormality, the side (i.e., engine control device) receiving the outputted concentration equivalent value can surely determine the failure of the liquid concentration measuring device itself based on the outputted concentration equivalent value.

The present invention can be implemented also as an invention of the engine control system including the engine control device as the construction that determines the failure as above.

That is, according to a fifteenth example aspect of the present invention, an engine control system has a liquid concentration measuring device and an engine control device. The liquid concentration measuring device includes at least detection electrodes arranged to face each other, a plurality of switching sections for switching charge and discharge of the detection electrodes, an operation signal outputting section capable of outputting an operation signal of a first frequency for switching the switching section in a first cycle and an operation signal of a second frequency for switching the switching section in a second cycle, a measurement value outputting section that is capable of outputting a voltage corresponding to a capacitance of the detection electrodes as a measurement value and that is capable of outputting a first measurement value due to the first frequency and a second measurement value due to the second frequency, and a concentration equivalent value outputting section that is capable of outputting a concentration equivalent value corresponding to a measurement difference between the first measurement value and the second measurement value outputted by the measurement value outputting section based on the measurement difference and a correspondence relationship between the measurement difference and the concentration equivalent value and that outputs the concentration equivalent value corresponding to the measurement difference even in a case of an abnormality, in which the measurement difference falls below the minimum of the difference between the measurement values capable of appearing in a case of a normality. The engine control device includes at least an air-fuel ratio sensing section for measuring an air-fuel ratio of fuel, an injection quantity calculating section for calculating a fuel injection quantity based on an air-fuel ratio correction value calculated based on an output of the air-fuel ratio sensing section and the concentration equivalent value outputted by the concentration equivalent value outputting section, an injection controlling section for performing fuel injection control based on the fuel injection quantity calculated by the injection quantity calculating section, and a failure determining section for determining a failure based on the concentration equivalent value outputted by the concentration equivalent value outputting section.

According to a sixteenth example aspect of the present invention, the concentration equivalent value outputting section outputs the concentration equivalent value in the case of the abnormality by performing extrapolation based on the correspondence relationship.

Also with such the engine control system, the failure of the liquid concentration measuring device itself can be surely determined.

As in the above-described engine control system, according to a seventeenth example aspect of the present invention, the allowable range is set to be wider than in the case of the normality when the failure determining section determines that the failure has occurred. With such the construction, the guard similar to the case of the normality is not applied to the air-fuel ratio learning value. Accordingly, the calculation of the inappropriate injection quantity can be avoided.

For example, according to an eighteenth example aspect of the present invention, the allowable range is set such that a value, which the air-fuel ratio correction value can take when the concentration equivalent value is assumed to be constant, is included in the allowable range when the failure determining section determines that the failure has occurred. With such the construction, the new allowable range can be set appropriately.

Moreover, as in the above-described engine control system, according to a nineteenth example aspect of the present invention, the normal range is set to be wider than in the case of the normality when the failure determining section determines that the failure has occurred. Thus, the abnormality determination of the fuel system can be avoided.

According to a twentieth example aspect of the present invention, the normal range is set such that a value, which the injection quantity correction value can take when the concentration equivalent value is assumed to be constant, is included in the normal range when the failure determining section determines that the failure has occurred. With such the construction, the new normal range can be set appropriately.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF EXAMPLE EMBODIMENTS

Figure 1:
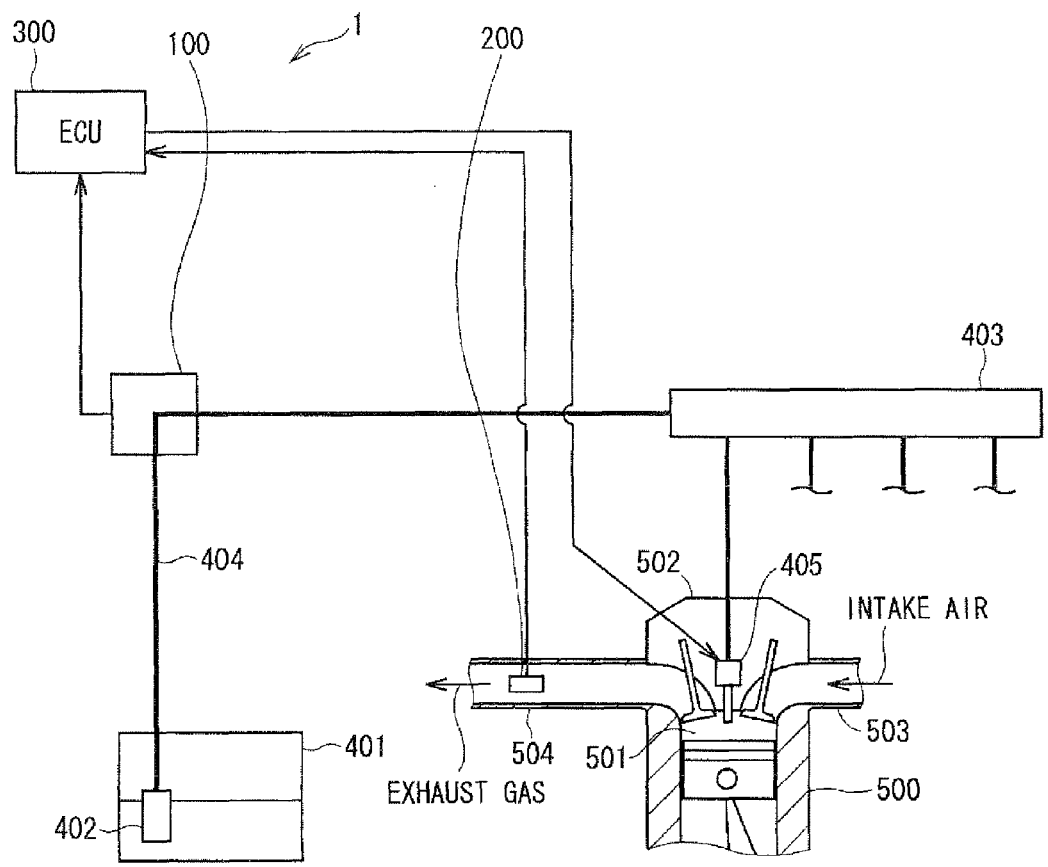
FIG. 1 is a diagram illustrating a schematic construction of an engine control system according to a first embodiment of the present invention.

Hereinafter, a first embodiment of the present invention will be described with reference to the drawings. An engine control system according to the present embodiment is mounted and used in a vehicle and performs the optimum fuel injection to a combustion chamber of an engine. As shown in FIG. 1, the engine control system 1 according to the present embodiment has an alcohol concentration sensor 100, an air-fuel ratio sensor 200 and an engine ECU 300 as main components.

The alcohol concentration sensor 100 measures an ethanol concentration in a mixed gasoline, which is drawn from a fuel tank 401 by a fuel pump 402. Therefore, the alcohol concentration sensor 100 is provided in a middle of a pipe 404 leading from the fuel tank 401 to a fuel rail 403.

Multiple injectors 405 are connected to the fuel rail 403. The injector 405 injects the fuel to a combustion chamber 501 of a cylinder 500 of the engine. Therefore, the injector 405 is fixed to an engine head 502 to enable the fuel injection to the combustion chamber 501.

An intake pipe 503 and an exhaust pipe 504 are connected to the combustion chamber 501. Thus, the fuel is injected to intake air, which is introduced via the intake pipe 503, inside the combustion chamber 501. The fuel is ignited by a spark plug (not shown), and then, exhaustion is performed via the exhaust pipe 504.

The air-fuel ratio sensor 200 is provided in a middle of the exhaust pipe 504 and senses an air-fuel ratio based on components of the exhaust gas.

The above-mentioned alcohol concentration sensor 100 and the air-fuel ratio sensor 200 are connected to the engine ECU 300. The engine ECU 300 calculates the fuel injection quantity that optimizes the air-fuel ratio based on the ethanol concentration measured with the alcohol concentration sensor 100, an air-fuel ratio feedback value based on the sensing result of the air-fuel ratio sensor 200 and the like. The engine ECU 300 energizes the injector 405 to perform fuel injection control based on the calculated fuel injection quantity.

Figure 2:
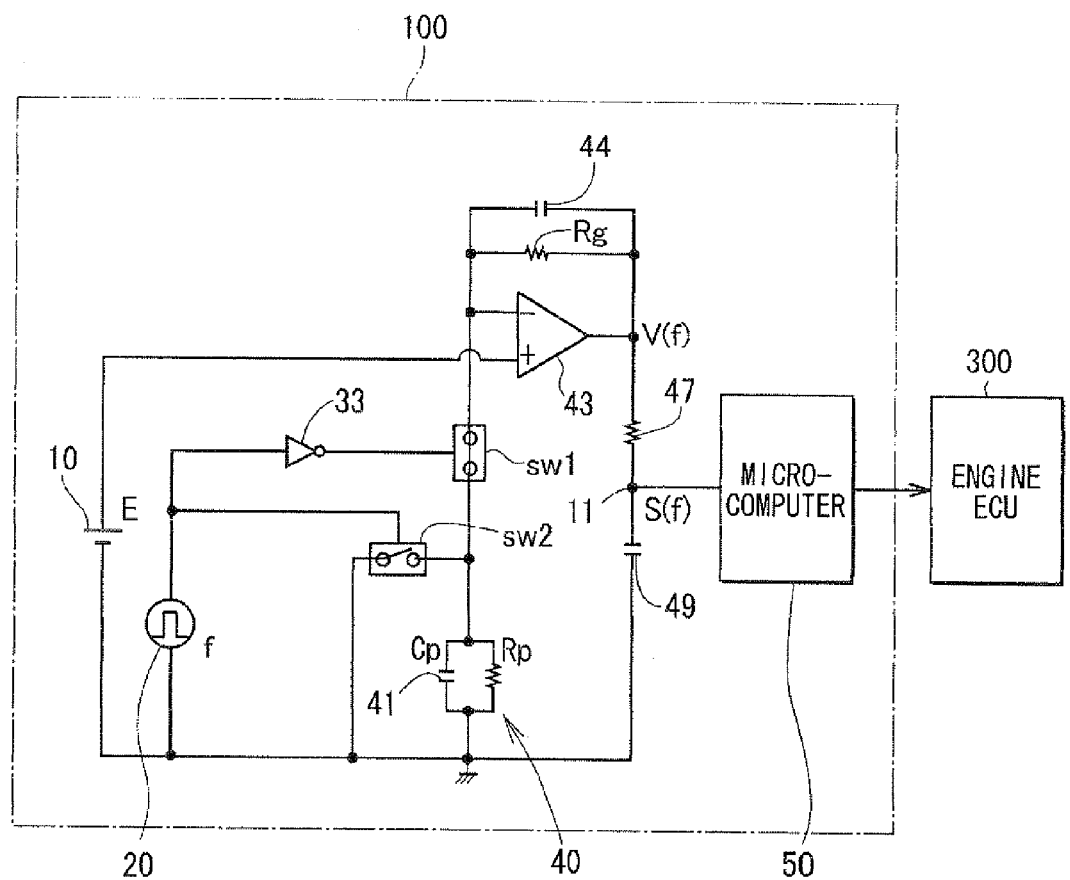
FIG. 2 is a diagram illustrating a circuit configuration of an alcohol concentration sensor according to the first embodiment.

Next, a circuit configuration of the alcohol concentration sensor 100 according to the present embodiment will be explained. FIG. 2 is a diagram illustrating the circuit configuration of the alcohol concentration sensor 100 according to the present embodiment.

In the alcohol concentration sensor 100, a battery 10 shown in FIG. 2 supplies a reference voltage E (1V in the present embodiment), and a measurement value is outputted to a microcomputer 50 from a terminal 11 shown in FIG. 2.

The alcohol concentration sensor 100 has an oscillation section 20, a detection section 40, the microcomputer 50 and the like. For example, the oscillation section 20 consists of a schmitt trigger providing hysteresis in a determining operation, a resistor connected in parallel with the schmitt trigger, and a capacitor connected between an input side of the schmitt trigger and a ground potential. Thus, the oscillation section 20 outputs a pulse wave (operation clock) of a frequency f.

The oscillation section 20 is configured to be able to output pulse waves of two different frequencies f1, f2 as explained in detail later. For example, the oscillation section 20 has a pair of constructions, each of which consists of the schmitt trigger, the resistor and the capacitor. Alternatively, any construction may be employed if similar outputs can be obtained.

The microcomputer 50 mentioned above realizes switching of such the two kinds of frequencies f1, f2. In FIG. 2, a control line from the microcomputer 50 to the oscillation section 20 is not shown to avoid complexity.

The pulse wave from the oscillation section 20 switches two switches sw1, sw2. A NOT circuit 33 is connected between the switch sw1 and the oscillation section 20. With such the construction, an inverted pulse wave, which is different from a pulse wave inputted to the other switch sw2, is inputted to the switch sw1. As a result, the pulse wave of the frequency f outputted from the oscillation section 20 causes the switches sw1, sw2 to repeat ON and OFF alternately.

The detection section 40 has detection electrodes 41. The detection electrodes 41 are arranged inside the pipe 404 (shown in FIG. 1), which defines a fuel passage of the vehicle. The detection electrodes 41 are arranged to face each other to constitute a capacitor. In the present embodiment, the ethanol concentration is measured by measuring a capacitance of the detection electrodes 41. In this case, there exists a leakage resistance Rp as a factor that disturbs the measurement. The resistance Rp shown in the detection section 40 changes due to mixing of impurities. It can be thought that the leakage resistance Rp is connected in parallel with the detection electrodes 41.

A positive terminal of the detection electrodes 41 is connected to an inverting input terminal of an operational amplifier 43 via the switch sw1. A capacitor 44 and a gain resistance Rg are connected in parallel between an output terminal and the inverting input terminal of the operational amplifier 43. The reference voltage E is inputted to a non-inverting input terminal of the operational amplifier 43. The positive terminal of the detection electrodes 41 is grounded via the switch sw2. A negative terminal of the detection electrodes 41 is grounded directly.

The output terminal of the operational amplifier 43 is connected to the terminal 11 via a resistor 47. The terminal 11 is grounded via a capacitor 49. With such the construction, an output voltage V(f) of the operational amplifier 43 turns into a smoothed measurement value S(f) at the terminal 11. The measurement value S(f) is inputted to the microcomputer 50.

As mentioned above, the microcomputer 50 operates the oscillation section 20 at the two kinds of frequencies f1, f2. The microcomputer 50 reads the measurement value S(f1) during a period, in which the oscillation section 20 outputs the pulse wave of the frequency f1. The microcomputer 50 reads the measurement value S(f2) during a period, in which the oscillation section 20 outputs the pulse wave of the frequency f2.

Next, an operation of the alcohol concentration sensor 100 according to the present embodiment will be explained. As mentioned above, the two switches sw1, sw2 repeat ON and OFF alternately due to the pulse wave (operation clock) from the oscillation section 20. Next, a flow of a current in the case where the pulse wave of the frequency f is inputted and the switches sw1, sw2 are switched on and off will be explained based on FIGS. 3A and 3B. Change of the current will be explained based on FIG. 4.

Figure 3:
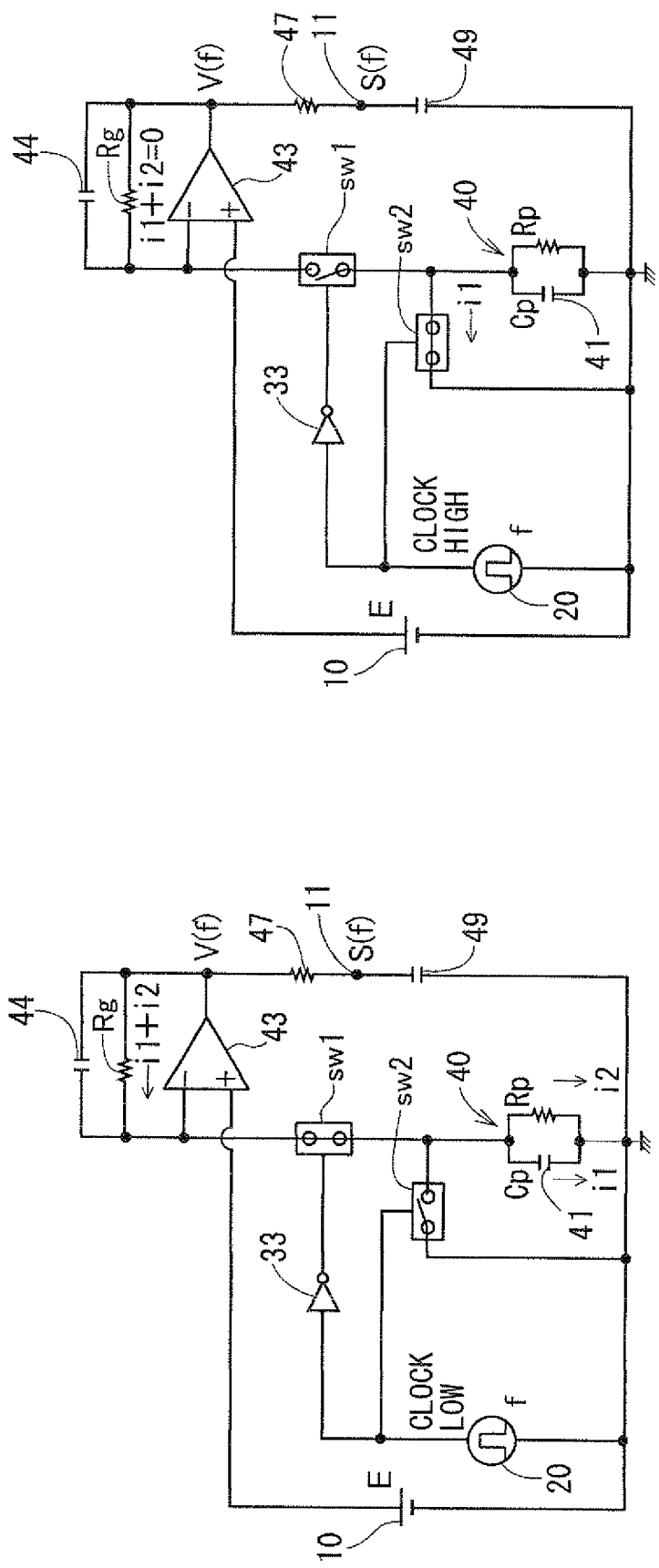
FIGS. 3A and 3B are diagrams illustrating an operation of the alcohol concentration sensor according to the first embodiment.

When the pulse wave is at a low level, the switch sw1 becomes ON and the other switch sw2 becomes OFF as shown in FIG. 3A. In this case, the operational amplifier 43 operates to equalize potentials of the non-inverting input terminal and the inverting input terminal. Accordingly, a current (i1+i2) arises in the gain resistance Rg due to the reference voltage E as shown in FIG. 3A. The current caused in the detection electrodes 41 is denoted with i1, and the current caused in the leakage resistance Rp is denoted with i2.

Figure 4:
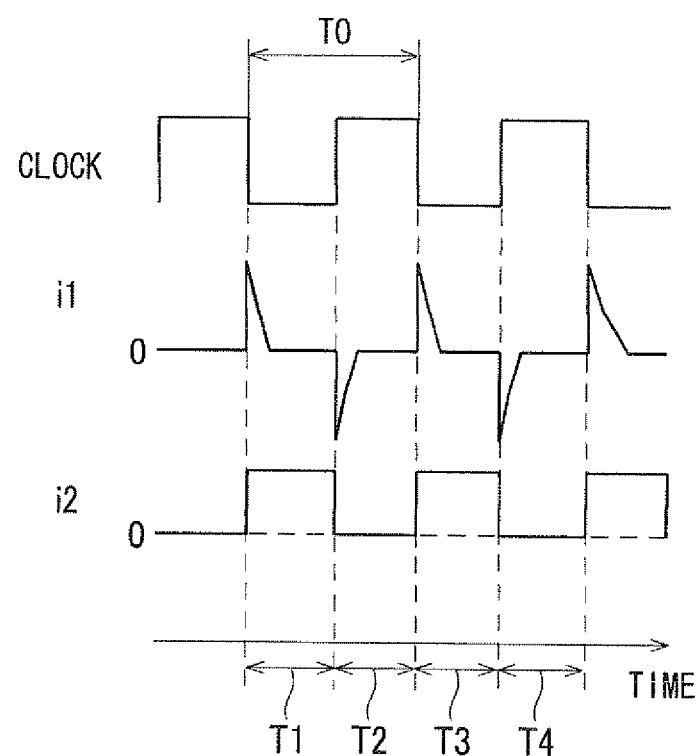
FIG. 4 is a diagram illustrating currents caused in detection electrodes and a leakage resistance according to the first embodiment.

At that time, as shown in periods T1 and T3 in FIG. 4, the current i1 caused in the detection electrodes 41 rises first and then becomes zero when the detection electrodes 41 are charged. The current i2 caused in the leakage resistance Rp, which is regarded to be connected in parallel with the detection electrodes 41, becomes a constant value. In a strict sense, the current i2 rises in retard of the current i1 since the current (i1+i2) is constant, and therefore the current i1 and the current i2 do not rise at the same time. However, for the sake of convenience, the explanation is given here assuming that the current i2 is a constant value.

When the pulse wave is at a high level, the switch sw1 becomes OFF and the other switch sw2 becomes ON as shown in FIG. 3B. In this case, since the positive side of the detection electrodes 41 is grounded, the detection electrodes 41 having been charged is discharged. Therefore, the current i1 in a direction opposite to the direction in the case where the pulse wave is at the low level is caused in the detection electrodes 41.

At that time, as shown in periods T2 and T4 in FIG. 4, the current flowing through the detection electrodes 41 rises in the opposite direction and then becomes zero when the discharge of the detection electrodes 41 ends. The current i2 flowing through the leakage resistance Rp, which is regarded to be connected in parallel with the detection electrodes 41, is zero.

Next, the output voltage V(f) of the operational amplifier 43 in the case where the switches sw1, sw2 are switched by the pulse wave of the frequency f. in this way will be explained. As understood from FIG. 4, an average of the current i2 is expressed by a following Expression 1.

$$\text{Average } i2 = \frac{0.5E}{Rp} \qquad \text{Expression 1:}$$

An electric charge $\Delta Q$ of the detection electrodes 41 is expressed by a following Expression 2. Cp in the Expression 2 represents the capacitance of the detection electrodes 41 and E is the reference voltage E.

$$\Delta Q = CpE \qquad \text{Expression 2:}$$

An average of the current i1 is a time differential of the electric charge $\Delta Q$. Therefore, an average of the current i1 is expressed by a following Expression 3 by using Expression 2. In the Expression 3, T0(=1/f) represents a cycle (refer to FIG. 4).

$$\text{Average } i1 = \frac{\Delta Q}{T0} = \frac{CpE}{T0} = Cp\,Ef \qquad \text{Expression 3:}$$

Therefore, the output voltage V(f) can be expressed by a following Expression 4 by using the Expressions 1 and 3.

$$V(f) = E + Rg(i1 + i2) \qquad \text{Expression 4:}$$
$$= E + Rg\left(\frac{CpE}{T0} + \frac{0.5E}{Rp}\right)$$
$$= E\left(1 + 0.5\frac{Rg}{Rp} + fRgCp\right)$$

A feature of the present embodiment exists in detecting a stuck failure abnormality, in which the output voltage V(f) becomes a fixed value. Even if the output voltage V(f) takes a certain value, it cannot be determined whether the value is abnormal.

Therefore, in the present embodiment, the switches sw1, sw2 are switched by the pulse waves of the two different frequencies f1, f2 from the oscillation section 20, and a difference between the output voltages V(f1), V(f2) of the operational amplifier 43 is obtained. That is, a following Expression 5 is used.

$$V(f1)-V(f2)=E\cdot(f1-f2)\cdot Rg\cdot Cp \qquad \text{Expression 5:}$$

With such the construction, when the stuck failure abnormality occurs, the value of the Expression 5 approximates to 0. Therefore, in the present embodiment, a difference between the measurement values S(f1), S(f2) outputted from the terminal 11 is calculated with the microcomputer 50, and the stuck failure abnormality is determined as mentioned in detail later.

Figure 5:
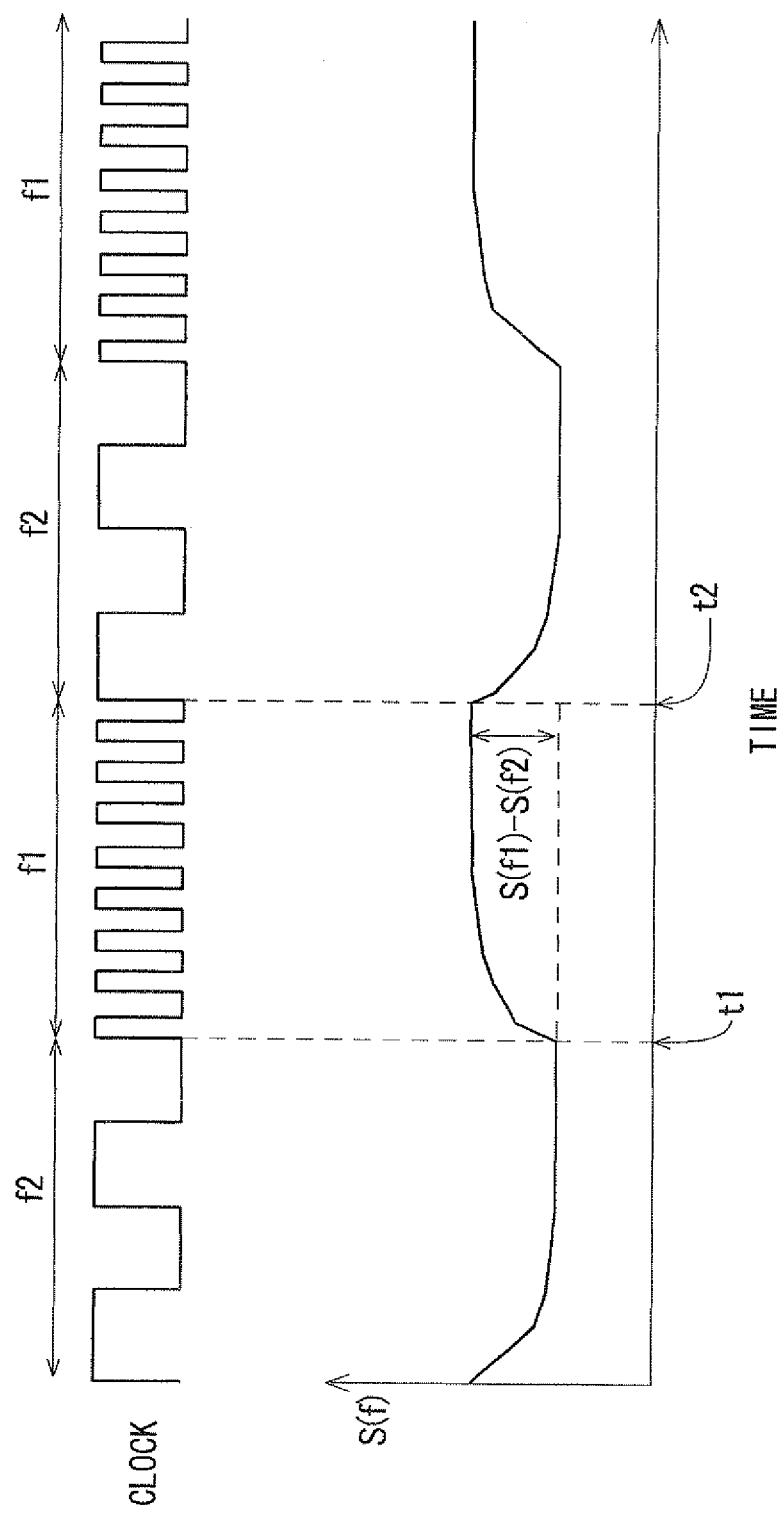
FIG. 5 is a diagram illustrating a relationship between a frequency and a measurement value according to the first embodiment.

FIG. 5 is a diagram illustrating a change of the measurement value S(f) outputted to the terminal 11. The output voltages V(f1), V(f2) from the operational amplifier 43 are smoothed by the resistor 47 and the capacitor 49. In FIG. 5, the switching of the switches sw1, sw2 is performed by the pulse wave of the frequency f2 first. The measurement value S(f) substantially converges by time t1. Then, the switching of the switches sw1, sw2 is performed by the pulse wave of the frequency f1 from the time t1. Thereafter, the measurement value S(f) substantially converges by time t2. Therefore, switching timing between the frequencies f1, f2 is controlled based on such the change of the measurement value S(f).

Figure 6:
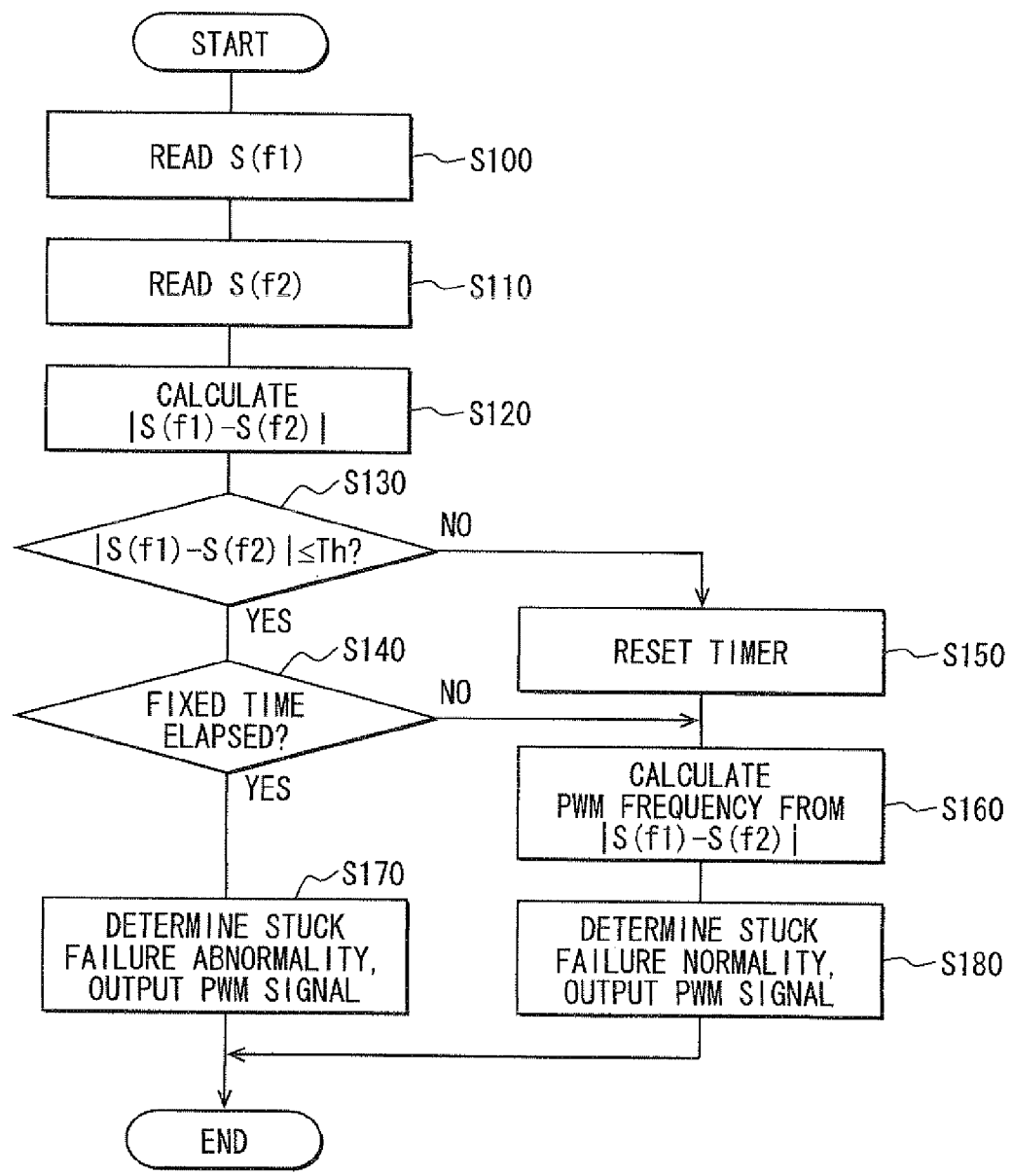
FIG. 6 is a flowchart showing sensor output processing executed by a microcomputer according to the first embodiment.

Next, sensor output processing performed by the microcomputer 50 will be explained. FIG. 6 is a flowchart showing the sensor output processing according to the present embodiment. The sensor output processing is performed repeatedly while the electric power is supplied to the alcohol concentration sensor 100 after the engine is switched on.

In first S100 (S means "Step"), the measurement value S(f1) is read. This processing is to read the output voltage from the terminal 11 when the oscillation section 20 is outputting the pulse wave of the frequency f1.

The measurement value S(f2) is read in following S110. This processing is to read the output voltage from the terminal 11 when the oscillation section 20 is outputting the pulse wave of the frequency f2.

As shown in FIG. 5, the measurement value S(f) changes with time. Therefore, the measurement values S(f) in a substantially converged state may be read in S100 and S110. That is, the measurement values S(f) immediately before the switching of the frequency f (i.e., measurement values S(f) immediately preceding time t1 and time t2 respectively) may be read in S100 and S110.

Figure 7:
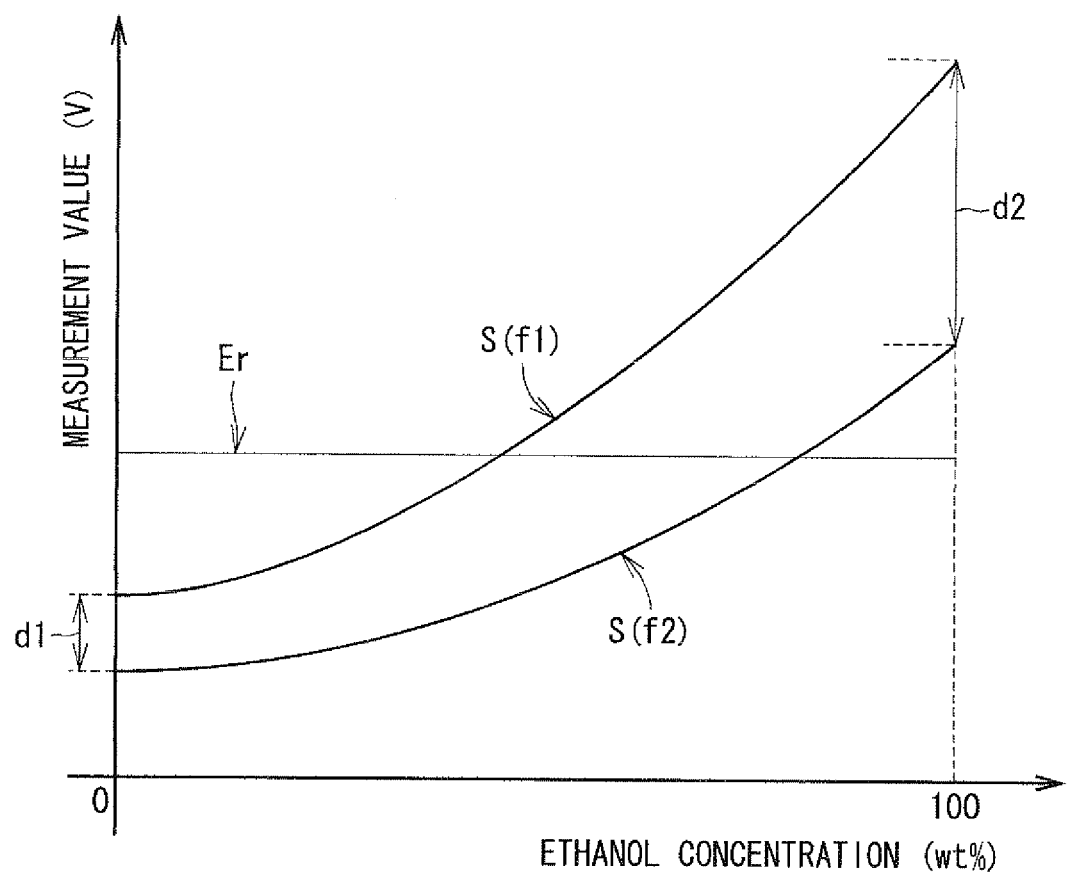
FIG. 7 is a diagram illustrating a relationship between an ethanol concentration and the measurement value according to the first embodiment.

In following S120, a difference |S(f1)−S(f2)| between the two measurement values is calculated. FIG. 7 shows a relationship between the ethanol concentration and the measurement value. Both of the measurement value S(f1), S(f2) are expressed as nonlinear curves. The difference |S(f)−S(f2)| between the measurement values becomes the minimum d1 (V) when the ethanol concentration is 0 wt % and becomes the maximum d2 (V) when the ethanol concentration is 100 wt %.

In following S130, it is determined whether the difference |S(f1)−S(f2)| between the measurement values is "equal to or smaller than" a predetermined value Th. This processing is to determine the stuck failure abnormality. If the stuck failure abnormality occurs, both of the measurement values S(f1), S(f2) become a substantially constant voltage Er as shown in FIG. 7. Therefore, the predetermined value Th is set at a value equal to or smaller than the minimum of the difference |S(f1)−S(f2)| that can occur in a case of a normality. That is, the predetermined value Th is set such that Th≤d1. When the difference |S(f1)−S(f2)| between the measurement values is equal to or smaller than Th (S130: YES), the processing shifts to S140. When the difference |S(f1)−S(f2)| between the measurement values is larger than Th (S130: NO), a timer is reset in S150. Then, the processing shifts to S160.

In S140, it is determined whether a fixed time has elapsed based on the timer. When it is determined that the fixed time has elapsed (S140: YES), the processing shifts to S170. When the fixed time has not elapsed (S140: NO), the processing shifts to S160.

In S160, the ethanol concentration is calculated from the difference |S(f1)−S(f2)| between the measurement values, and a PWM frequency is calculated.

Figure 8:
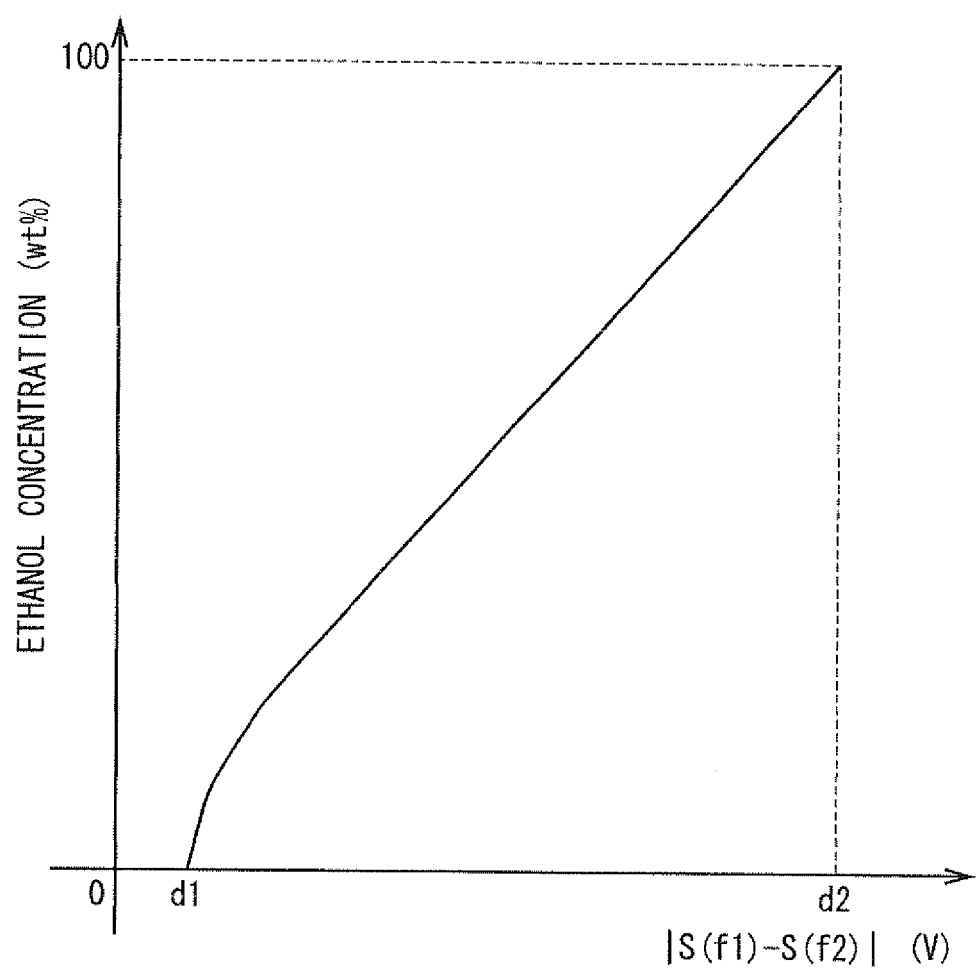
FIG. 8 is a diagram illustrating a correspondence relationship between a difference between the measurement values and the ethanol concentration according to the first embodiment.
Figure 9:
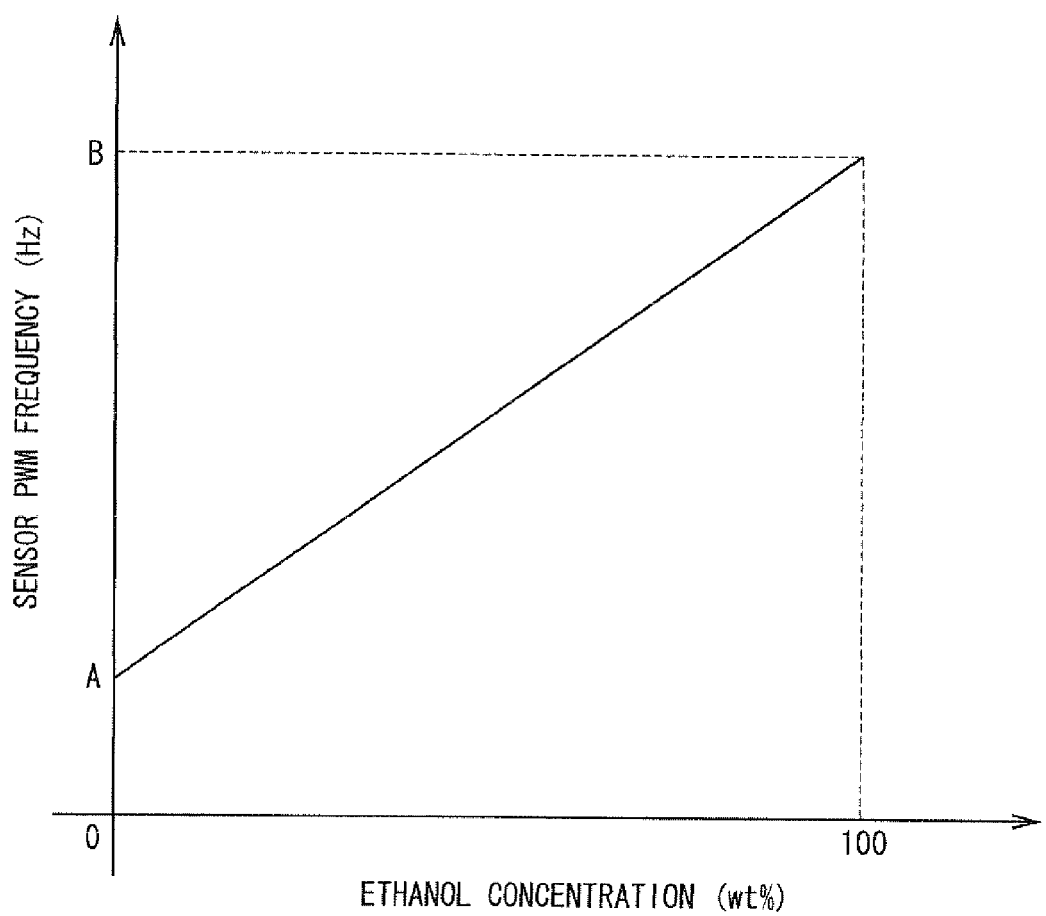
FIG. 9 is a diagram illustrating a relationship between the ethanol concentration and a PWM frequency according to the first embodiment.

Next, the calculation of the ethanol concentration and the PWM frequency will be explained. The minimum of the difference |S(f1)−S(f2)| between the measurement values is d1 and the maximum of the same is d2. Therefore, the ethanol concentration is calculated based on a map of the difference |S(f1)−S(f2)| between the measurement values and the ethanol concentration as shown in FIG. 8. The PWM frequency is calculated based on a map of the ethanol concentration and the PWM frequency as shown in FIG. 9. The PWM frequency in a range from A to B (Hz) is linearly related to the ethanol concentration in a range from 0 to 100 (wt %).

In S180 following S160, stuck failure normality determination is performed, and a PWM signal in the range of the PWM frequency from A to B (Hz) is outputted. Thereafter, the present sensor output processing is ended.

In S170, stuck failure abnormality determination is performed, and a PWM signal of a specific frequency corresponding to the stuck failure abnormality is outputted. Thereafter, the present sensor output processing is ended.

Figure 10:
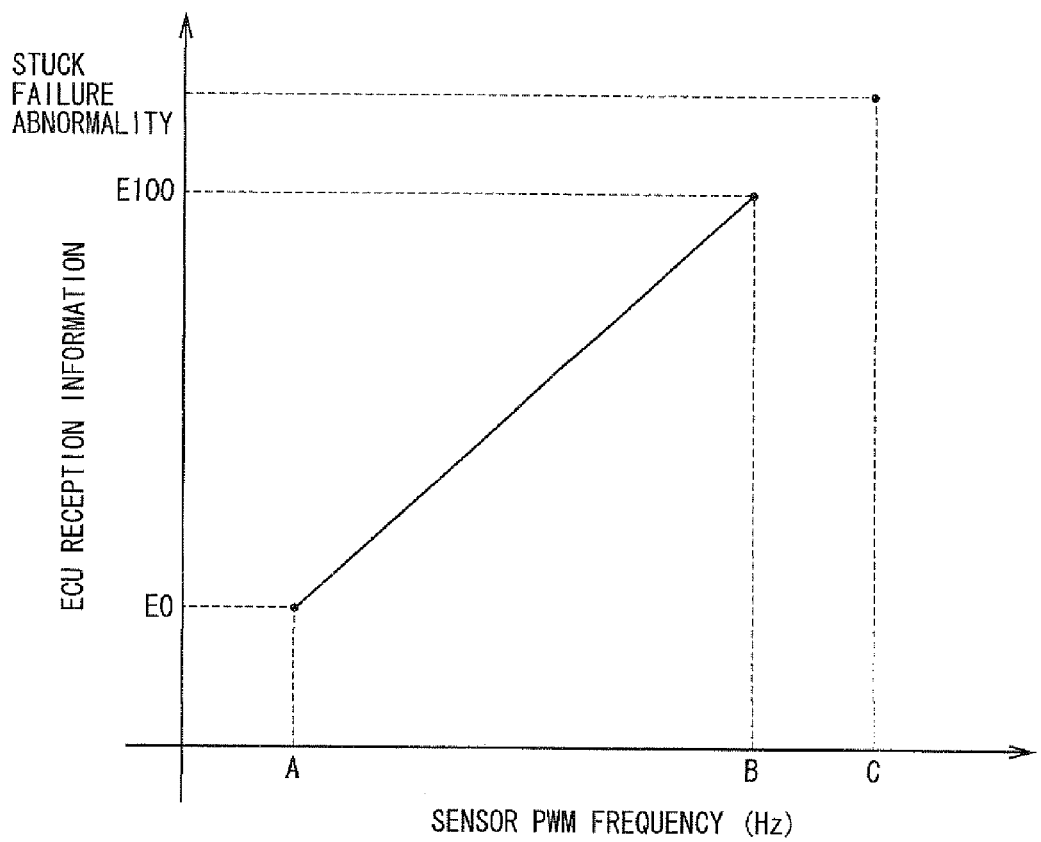
FIG. 10 is a diagram illustrating the PWM frequency outputted from the microcomputer according to the first embodiment.

As shown in FIG. 10, when the stuck failure normality determination is performed, the PWM signal of the frequency from A to B linearly corresponding to the ethanol concentration from 0 to 100 wt % is outputted to the engine ECU 300 (S180 in FIG. 6). When the stuck failure abnormality determination is performed, the PWM signal of a specific frequency C higher than the frequency B is outputted to the engine ECU 300 (S170 in FIG. 6). In FIG. 10, when the ethanol concentration is n wt %, the ethanol concentration received by the ECU 300 (i.e., ECU reception information) is indicated as En.

Figure 11:
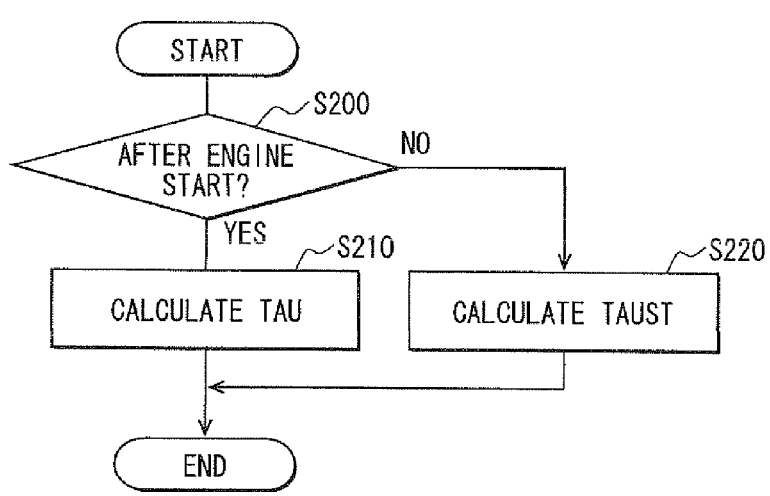
FIG. 11 is a flowchart showing injection quantity calculation processing according to the first embodiment.

In this way, if the PWM signal of the specific frequency C is outputted from the alcohol concentration sensor 100, the engine ECU 300 may light a warning light of the vehicle or the like to notify the driver of the failure. If the PWM signal is outputted from the alcohol concentration sensor 100, the ECU 300 performs injection quantity calculation processing irrespective of the abnormality determination. FIG. 11 is a flowchart showing the injection quantity calculation processing performed in the engine ECU 300.

In first S200, it is determined whether present time is after the engine start. This processing is performed because a different calculation formula of the fuel injection quantity is used when the engine is started. When it is determined that the present time is after the engine start (S200: YES), the processing shifts to S210. When it is determined that the present time is not after the engine start (S200: NO), the processing shifts to S220.

In S210, the fuel injection quantity TAU is calculated as shown by a following Expression 6. This processing is performed after the engine start.

Figure 12:
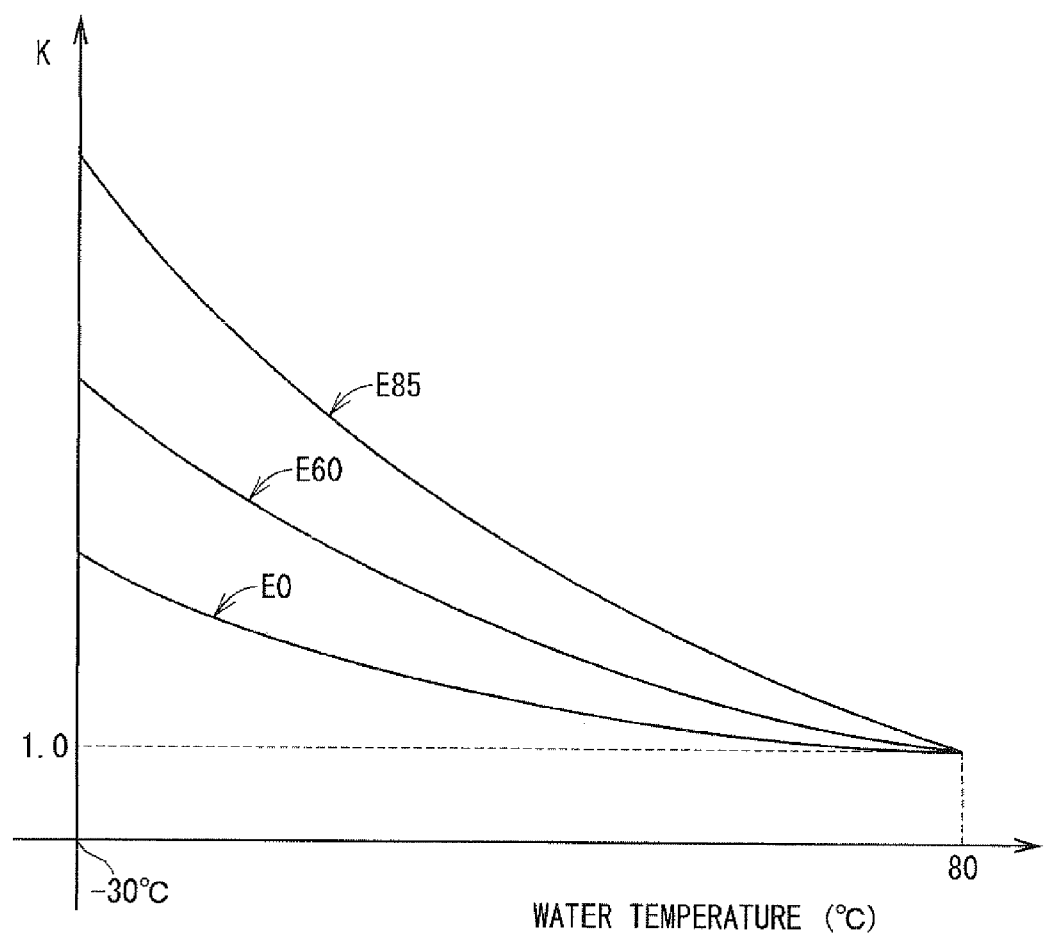
FIG. 12 is a diagram illustrating a relationship between water temperature and a quantity increase coefficient according to the first embodiment.
Figure 13:
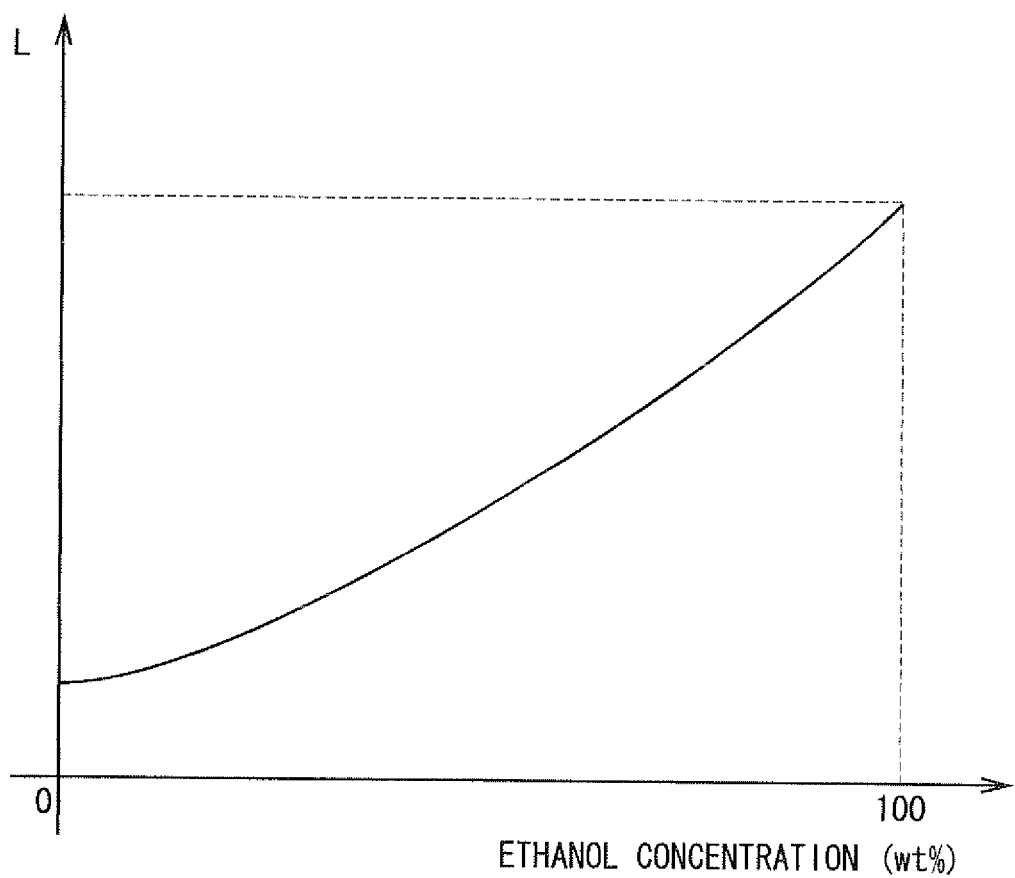
FIG. 13 is a diagram illustrating a relationship between the ethanol concentration and a concentration correction value according to the first embodiment.

Fuel injection quantity TAU=basic injection quantity TP×quantity increase coefficient K×fuel pressure correction coefficient Kp×alcohol concentration correction value L×(1+air-fuel ratio feedback value+air-fuel ratio learning value)  Expression 6:

The quantity increase coefficient K is calculated from water temperature and the ethanol concentration based on a map as shown in FIG. 12, for example. The alcohol concentration correction value L is calculated from the ethanol concentration based on a map as shown in FIG. 13, for example. The fuel pressure correction coefficient Kp is based on fuel pressure obtained by a fuel pressure sensor (not shown). The air-fuel ratio feedback value is a correction value calculated based on the output from the air-fuel ratio sensor 200. The air-fuel ratio learning value is the sum of the air-fuel ratio feedback value and the air-fuel ratio learning value as of the previous running stored when the engine is switched off. For convenience, the sum of the air-fuel ratio feedback value and the air-fuel ratio learning value will be referred to as an injection quantity correction value Hinj, hereafter.

In S220 of FIG. 11, the start time fuel injection quantity TAUST is calculated as shown by a following Expression 7. This processing is performed at the engine start.

Start time fuel injection quantity TAUST=start time basic injection quantity TPST×fuel pressure correction coefficient Kp×(1+air-fuel ratio learning value)  Expression 7:

The start time basic injection quantity TPST is calculated from the water temperature and the alcohol concentration based on a map (not shown).

The engine ECU 300 performs the injection control by energizing the injector 405 based on the thus-calculated fuel injection quantity TAU (or start time fuel injection quantity TAUST).

An allowable range in the case of the normality is defined for the air-fuel ratio feedback value mentioned above. The air-fuel ratio feedback value is calculated based on the output from the air-fuel ratio sensor 200. When the calculated air-fuel ratio feedback value is outside the allowable range, the air-fuel ratio feedback value is modified to an upper limit or a lower limit defining the allowable range.

Figure 14:
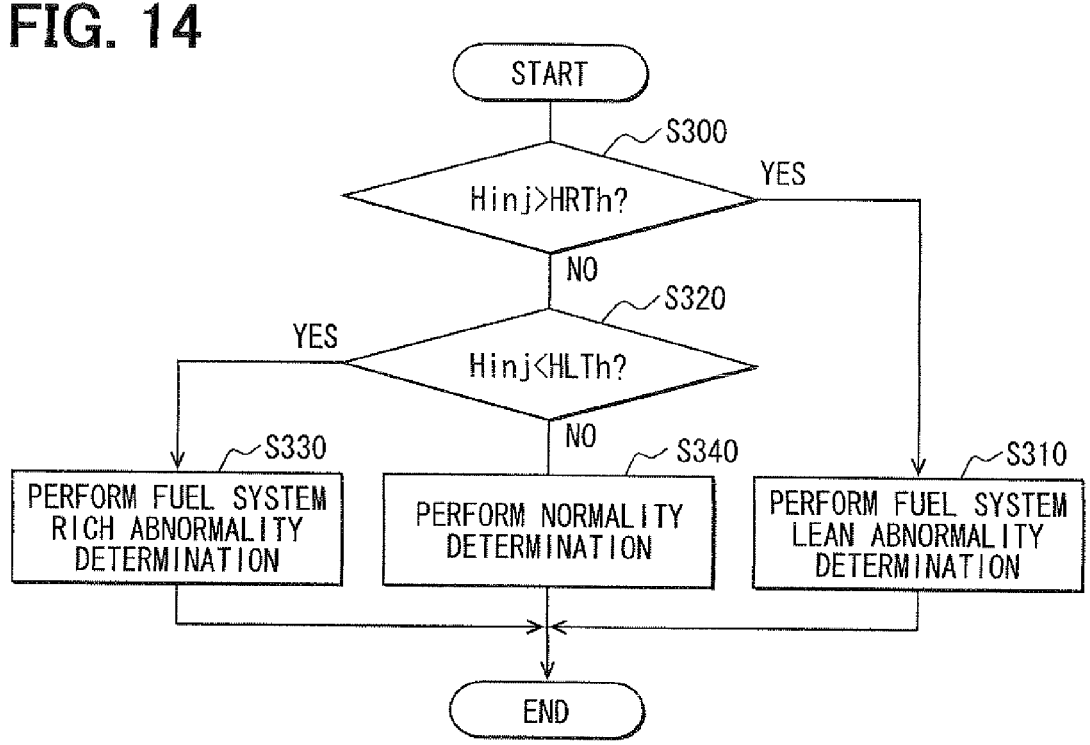
FIG. 14 is a flowchart showing air-fuel ratio abnormality determination processing according to the first embodiment.

The engine ECU 300 performs air-fuel ratio abnormality determination processing for determining whether the injection quantity correction value Hinj is abnormal. FIG. 14 is a flowchart showing the air-fuel ratio abnormality determination processing. The air-fuel ratio abnormality determination processing is for determining whether the calculated injection quantity correction value Hinj resides within a normal range. The air-fuel ratio abnormality determination processing is repeatedly performed while the engine is in operation.

In first S300, it is determined whether a state where the injection quantity correction value Hinj is larger than an upper limit HRTh has continued for a predetermined time. When it is determined that the state where the injection quantity correction value Hinj is larger than the upper limit HRTh has continued (S300: YES), it is determined that abnormal quantity increase correction has been necessitated and a fuel system has become lean. Accordingly, lean abnormality determination of the fuel system is performed in S310. Then, the present air-fuel ratio abnormality determination processing is ended. When it is determined that the injection quantity correction value Hinj is equal to or smaller than the upper limit HRTh or when it is determined that the injection quantity correction value Hinj is larger than the upper limit HRTh only temporarily (S300: NO), the processing shifts to S320.

In S320, it is determined whether a state where the injection quantity correction value Hinj is smaller than a lower limit HLTh has continued for a predetermined time. When it is determined that the state where the injection quantity correction value Hinj is smaller than the lower limit HLTh has continued (S320: YES), it is determined that abnormal quantity decrease correction has been necessitated and the fuel system has become rich. Accordingly, rich abnormality determination of the fuel system is performed in S330. Then, the present air-fuel ratio abnormality determination processing is ended. When it is determined that the injection quantity correction value Hinj is equal to or larger than the lower limit HLTh or when it is determined that the injection quantity correction value Hinj is smaller than the lower limit HLTh only temporarily (S320: NO), normality determination is performed in S340. Then, the present air-fuel ratio abnormality determination processing is ended.

When the abnormality determination of the fuel system is performed in the air-fuel ratio abnormality determination processing (S310, S330), the engine ECU 300 may light a warning light of the vehicle or the like to notify the driver of the abnormality in the fuel system, for example.

A feature of the present embodiment exists in that the engine ECU 300 sets the allowable range of the air-fuel ratio feedback value and the normal range of the injection quantity correction value Hinj again when the alcohol concentration sensor 100 breaks down. Next, this feature will be explained.

As mentioned above, when the alcohol concentration sensor 100 causes the stuck failure abnormality, the microcomputer 50 outputs the PWM signal of the specific frequency C.

Figure 15:
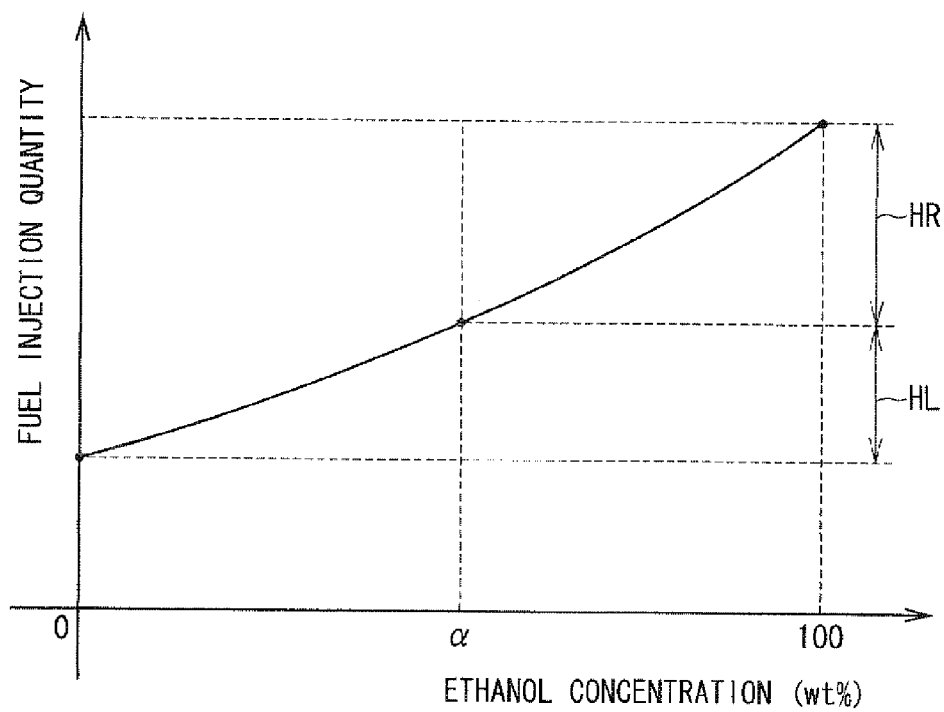
FIG. 15 is a diagram showing a relationship between the ethanol concentration and a fuel injection quantity according to the first embodiment.

At that time, the engine ECU 300 assumes the ethanol concentration to be a constant value α (for example, 50 wt %). FIG. 15 shows a relationship between the ethanol concentration and the fuel injection quantity. The fuel injection quantity increases as the ethanol concentration increases. Therefore, in the case where the ethanol concentration is assumed to be the constant value α, the fuel injection quantity is corrected to be increased by up to an amount HR shown in FIG. 15 if the actual ethanol concentration is higher than the value α. If the actual ethanol concentration is lower than the value α, the fuel injection quantity is corrected to be decreased by up to an amount HL shown in FIG. 15.

Therefore, if the ECU 300 determines the stuck failure abnormality based on the PWM signal of the specific frequency C, the engine ECU 300 sets an upper limit of the air-fuel ratio feedback value based on the quantity increase correction amount HR such that the correction equivalent to the amount HR is allowed. Also, the ECU 300 sets a lower limit of the air-fuel ratio feedback value based on the quantity decrease correction amount HL such that the correction equivalent to the amount HL is allowed. Thus, the allowable range of the air-fuel ratio feedback value is newly set.

Likewise, the engine ECU 300 sets an upper limit of the injection quantity correction value Hinj including the air-fuel ratio feedback value based on the quantity increase correction amount HR such that the correction equivalent to the amount HR is allowed. This upper limit is newly set as the upper limit HRTh in S300 of FIG. 14. Also, the engine ECU 300 sets a lower limit of the injection quantity correction value Hinj including the air-fuel ratio feedback value based on the quantity decrease correction amount HL such that the correction equivalent to the amount HL is allowed. This lower limit is newly set as the lower limit HLTh in S320 of FIG. 14. As a result, the normal range of the injection quantity correction value Hinj is newly set.

Next, effects exerted by the engine control system 1 according to the present embodiment will be explained. In the engine control system 1 according to the present embodiment, the microcomputer 50 of the alcohol concentration sensor 100 reads the measurement value S(f1) corresponding to the frequency f1 (S100 in FIG. 6) and reads the measurement value S(f2) corresponding to the frequency f2 (S110). Then, the difference |S(f1)−S(f2)| between the two measurement values is calculated (S120). The stuck failure abnormality determination is performed when the state where the difference |S(f1)−S(f2)| between the measurement values is equal to or smaller than the predetermined value Th continues (S130: YES, S140: YES). In this case, the PWM signal of the specific frequency C different from the frequency in the case of the normality is outputted to the engine ECU 300 (S170). Thus, the engine control system 1 can surely determine the failure of the alcohol concentration sensor 100 itself.

In the present embodiment, the determination is performed based on the difference |S(f1)−S(f2)| between the measurement values. Therefore, the failure can be determined comparatively easily.

Furthermore, in the present embodiment, the predetermined value Th is set at the value smaller than the minimum (d1 shown in FIG. 7) of the difference between the measurement values capable of appearing in the case of the normality. Therefore, the appropriate determination is realized.

In the present embodiment, if it is determined that the failure has occurred, the PWM signal of the specific frequency C is outputted to the engine ECU 300 (refer to FIG. 10) in place of the PWM signal of the frequency in the normal frequency range from A to B. Thus, the failure of the alcohol concentration sensor 100 can be determined easily on the engine ECU 300 side.

When the fuel is inferior, the leakage resistance in the detection electrodes becomes comparatively small. If the leakage resistance decreases, a measurement error of the ethanol concentration increases. Regarding this point, the difference |S(f1)−S(f2)| between the measurement values is obtained in the present embodiment. Therefore, the constant term including (1/Rp) can be removed, and the influence of the leakage resistance can be eliminated (refer to Expression 5).

As mentioned above, the allowable range of the air-fuel ratio feedback value in the case of the normality is set. The engine ECU 300 calculates the air-fuel ratio feedback value based on the output from the air-fuel ratio sensor 200. When the calculated air-fuel ratio feedback value is outside the allowable range, the air-fuel ratio feedback value is modified to the upper limit or the lower limit defining the allowable range.

However, if the failure arises in the alcohol concentration sensor 100, there is a possibility that the inappropriate fuel injection quantity is calculated adversely by modifying the air-fuel ratio feedback value to the upper limit or the lower limit (i.e., by applying guard to air-fuel ratio feedback value).

Regarding this point, in the present embodiment, if the engine ECU 300 determines the stuck failure abnormality based on the PWM signal of the specific frequency C, the engine ECU 300 sets the upper limit of the air-fuel ratio feedback value based on the quantity increase correction amount HR such that the correction equivalent to the amount HR is allowed (refer to FIG. 15). Also, the engine ECU 300 sets the lower limit of the air-fuel ratio feedback value based on the quantity decrease correction amount HL such that the correction equivalent to the amount HL is allowed (refer to FIG. 15). With such the construction, the guard similar to the case of the normality is not applied to the air-fuel ratio feedback value. Thus, the calculation of the inappropriate injection quantity can be avoided. The upper limit and the lower limit are set based on the quantity increase correction amount HR and the quantity decrease correction amount HL shown in FIG. 15. Therefore, the allowable range of the air-fuel ratio feedback value can be set appropriately.

In the present embodiment, if the engine ECU 300 determines the stuck failure abnormality based on the PWM signal of the specific frequency C, the engine ECU 300 sets the upper limit of the injection quantity correction value Hinj including the air-fuel ratio feedback value based on the quantity increase correction amount HR such that the correction equivalent to the amount HR is allowed (refer to FIG. 15). This upper limit is newly set as the upper limit HRTh in S300 of FIG. 14. Also, the engine ECU 300 sets the lower limit of the injection quantity correction value Hinj including the air-fuel ratio feedback value based on the quantity decrease correction amount HL such that the correction equivalent to the amount HL is allowed (refer to FIG. 15). This lower limit is newly set as the lower limit HLTh in S320 of FIG. 14. As a result, the normal range of the injection quantity correction value Hinj is newly set. Thus, the abnormality determination of the fuel system can be avoided. The upper limit and the lower limit are set based on the quantity increase correction amount HR and the quantity decrease correction amount HL shown in FIG. 15. Therefore, the normal range of the injection quantity correction value Hinj can be set appropriately.

The alcohol concentration sensor 100 according to the present embodiment constitutes a liquid concentration measuring device. The switches sw1, sw2 constitute switching sections. The oscillation section 20 constitutes an operation signal outputting section. The frequency f1 corresponds to a first frequency. The frequency f2 corresponds to a second frequency. The operational amplifier 43, the resistor 47 and the capacitor 49 constitute a measurement value outputting section. The measurement value S(f1) corresponds to a first measurement value. The measurement value S(f2) corresponds to a second measurement value. The microcomputer 50 constitutes a failure determining section and a concentration equivalent value outputting section. The PWM signal of the frequency from A to B outputted by the microcomputer 50 corresponds to a concentration equivalent value. The PWM signal of the specific frequency C corresponds to a failure value. The difference d1 shown in FIG. 7 corresponds to the minimum of the difference between the measurement values capable of appearing in the case of the normality. The air-fuel ratio sensor 200 constitutes an air-fuel ratio sensing section. The engine ECU 300 constitutes an injection quantity calculating section, an injection controlling section and an abnormality determining section. The air-fuel ratio feedback value corresponds to an air-fuel ratio correction value. The sum of the air-fuel ratio feedback value and the air-fuel ratio learning value corresponds to the injection quantity correction value. The air-fuel ratio sensor 200 and the engine ECU 300 constitute an engine control device.

The sensor output processing shown in FIG. 6 corresponds to processing as functions of the failure determining section and the concentration equivalent value outputting section. The injection quantity calculation processing shown in FIG. 11 corresponds to processing as a function of the injection quantity calculating section. The air-fuel ratio abnormality determination processing shown in FIG. 14 corresponds to processing as a function of the abnormality determining section.

Next, a second embodiment of the present invention will be described.

In the above-described first embodiment, the microcomputer 50 of the alcohol concentration sensor 100 determines the failure. Regarding this point, the engine ECU 300 determines the failure in the second embodiment.

Next, sensor output processing replacing the above-described sensor output processing (refer to FIG. 6) will be explained with reference to FIG. 16, first. Then, failure determination processing performed in the engine ECU 300 will be explained with reference to FIG. 19. The other general configuration and the like are the same as the above-described first embodiment.

Figure 16:
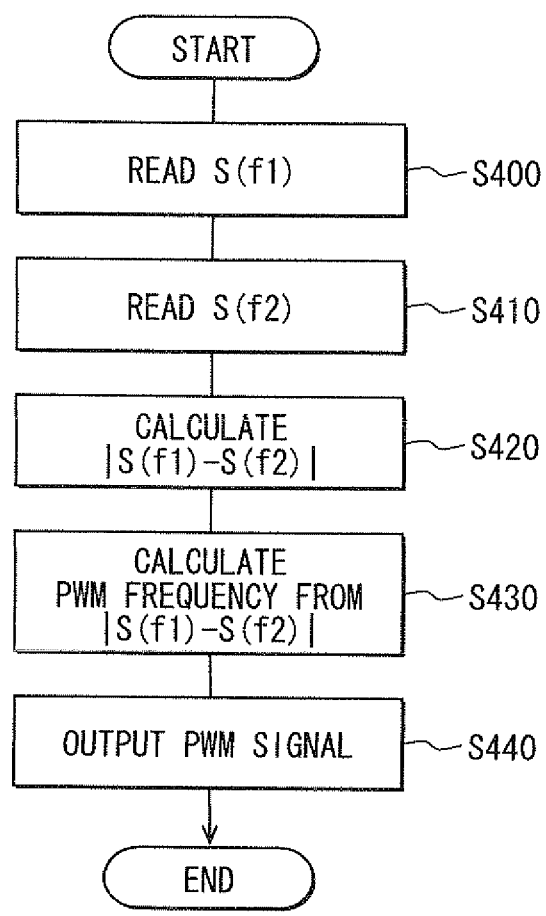
FIG. 16 is a flowchart showing sensor output processing according to a second embodiment of the present invention.

In first S400 of FIG. 16, the measurement value S(f1) is read. This processing is the same as S100 in FIG. 6. The measurement value S(f2) is read in following S410. This processing is the same as S110 in FIG. 6. Timings for reading the measurement values S(f1), S(f2) are the same as those explained in the above first embodiment.

In following S420, like S120 of FIG. 6, the difference |S(f1)−S(f2)| between the two measurement values is calculated. As mentioned above, the difference |S(f1)−S(f2)| between the measurement values becomes the minimum d1 (V) when the ethanol concentration is 0 wt % and becomes the maximum d2 (V) when the ethanol concentration is 100 wt % (refer to FIG. 7).

Figure 17:
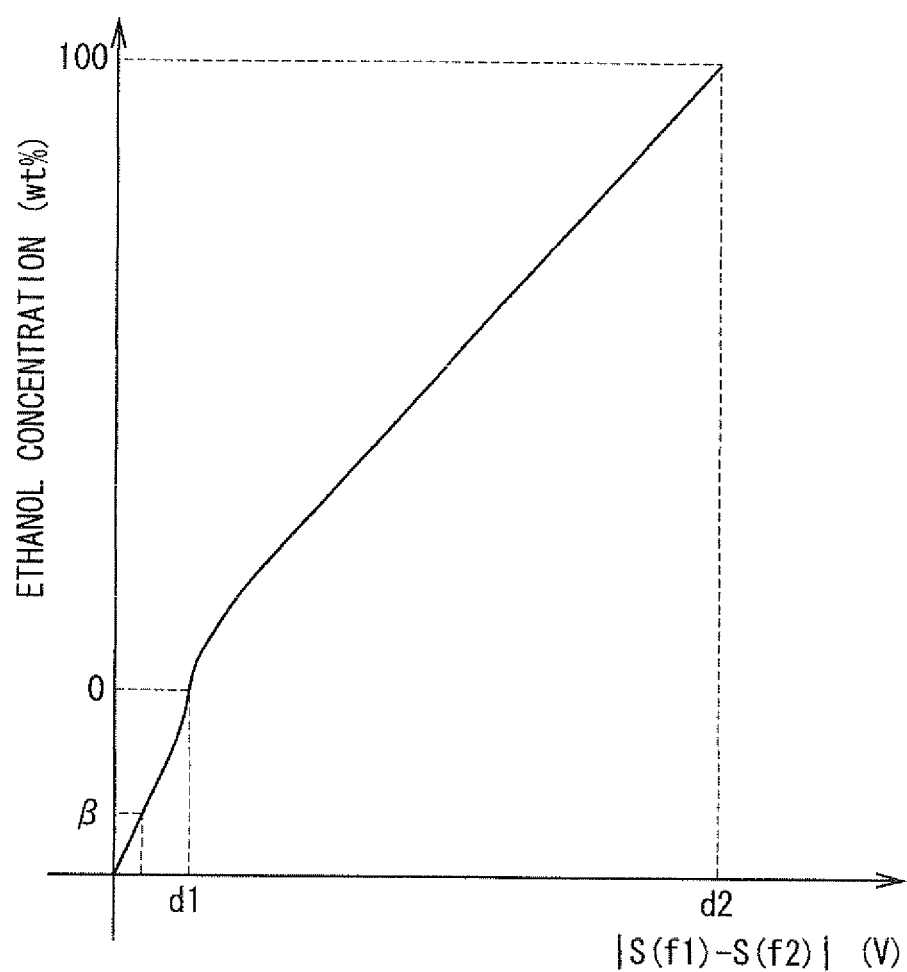
FIG. 17 is a diagram illustrating extrapolation for calculating an ethanol concentration from a difference between measurement values according to the second embodiment.
Figure 18:
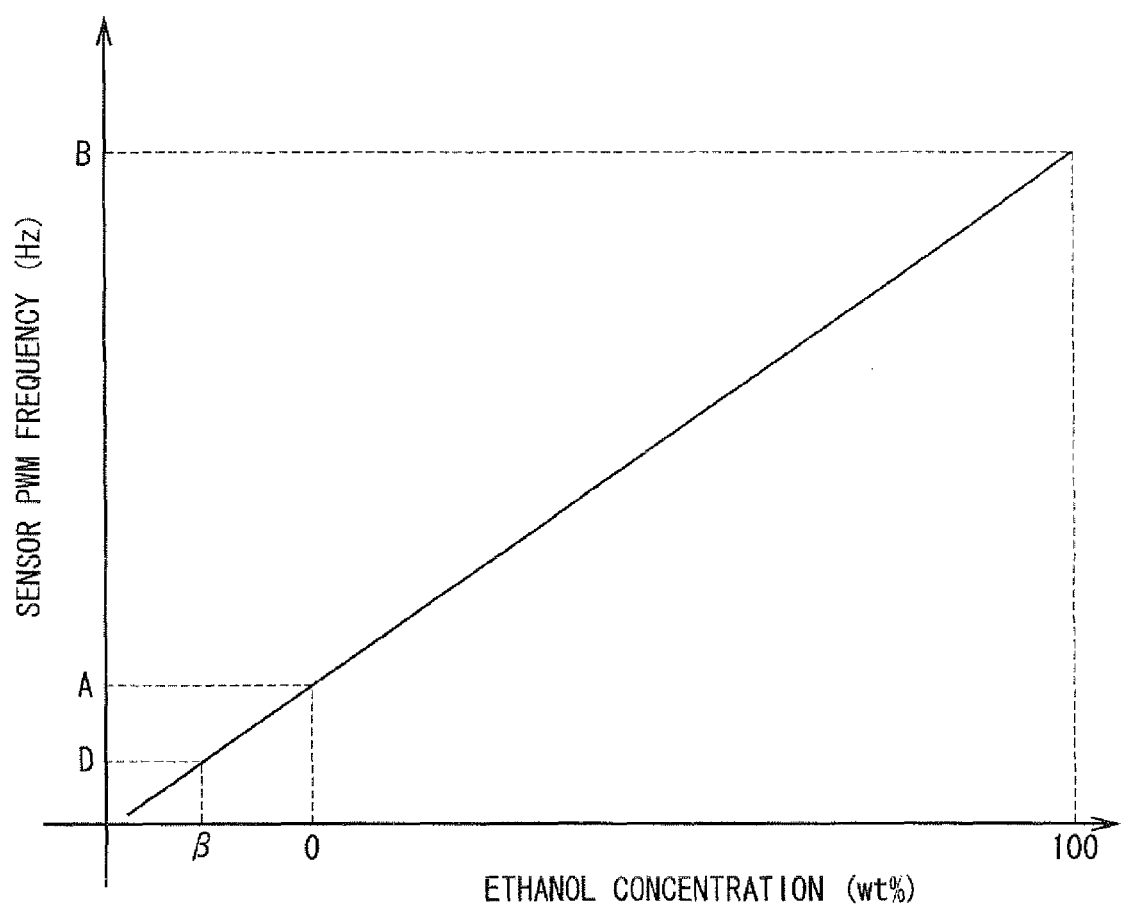
FIG. 18 is a diagram showing a relationship between the ethanol concentration and a PWM frequency according to the second embodiment.

In following S430, the PWM frequency is calculated from the difference |S(f1)−S(f2)| between the two measurement values. Normally, the difference |S(f1)−S(f2)| between the measurement values falls in the range from d1 to d2 (V). Therefore, the ethanol concentration is calculated based on a map of the difference |S(f1)−S(f2)| between the measurement values and the ethanol concentration as shown in FIG. 17. The PWM frequency is calculated based on a map of the ethanol concentration and the PWM frequency as shown in FIG. 18. The PWM frequency ranging from A to B (Hz) is linearly related to the ethanol concentration ranging from 0 to 100 (wt %).

However, if a stuck failure abnormality occurs, both of the measurement values S(f1), S(f2) become a substantially constant voltage Er(V) (refer to FIG. 7) as mentioned above. The difference |S(f1)−S(f2)| between the measurement values falls below the minimum d1 (i.e., approximates to zero). Therefore, for example, when the difference |S(f1)−S(f2)| between the measurement values falls below the minimum d1, the ethanol concentration is calculated by performing extrapolation as shown in FIG. 17. The ethanol concentration calculated in this case falls below 0 wt %.

Also in this case, the PWM frequency is calculated from the ethanol concentration based on the map of the ethanol concentration and the PWM frequency as shown in FIG. 18. In this case, the PWM frequency falls below the frequency A.

In following S440, the PWM signal of the PWM frequency calculated in S430 is outputted. That is, in the present embodiment, even when the stuck failure abnormality occurs, the PWM signal corresponding to the abnormal ethanol concentration is outputted.

Figure 19:
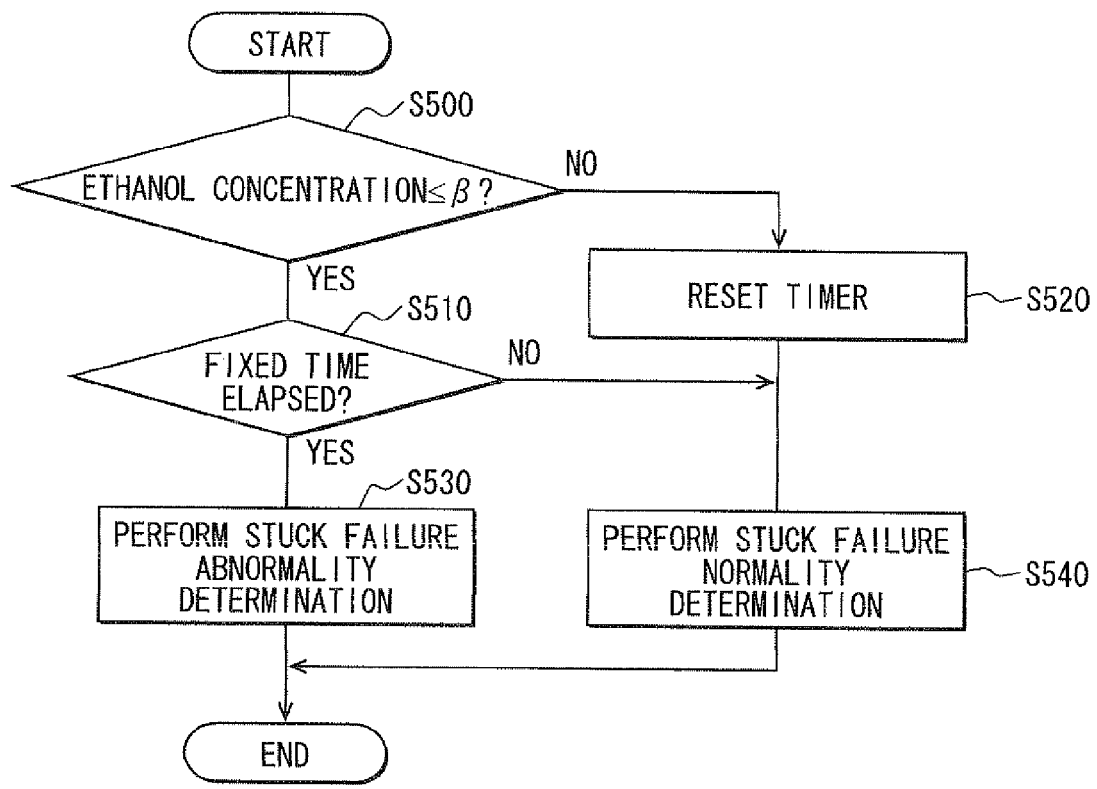
FIG. 19 is a flowchart showing failure determination processing according to the second embodiment.
Figure 20:
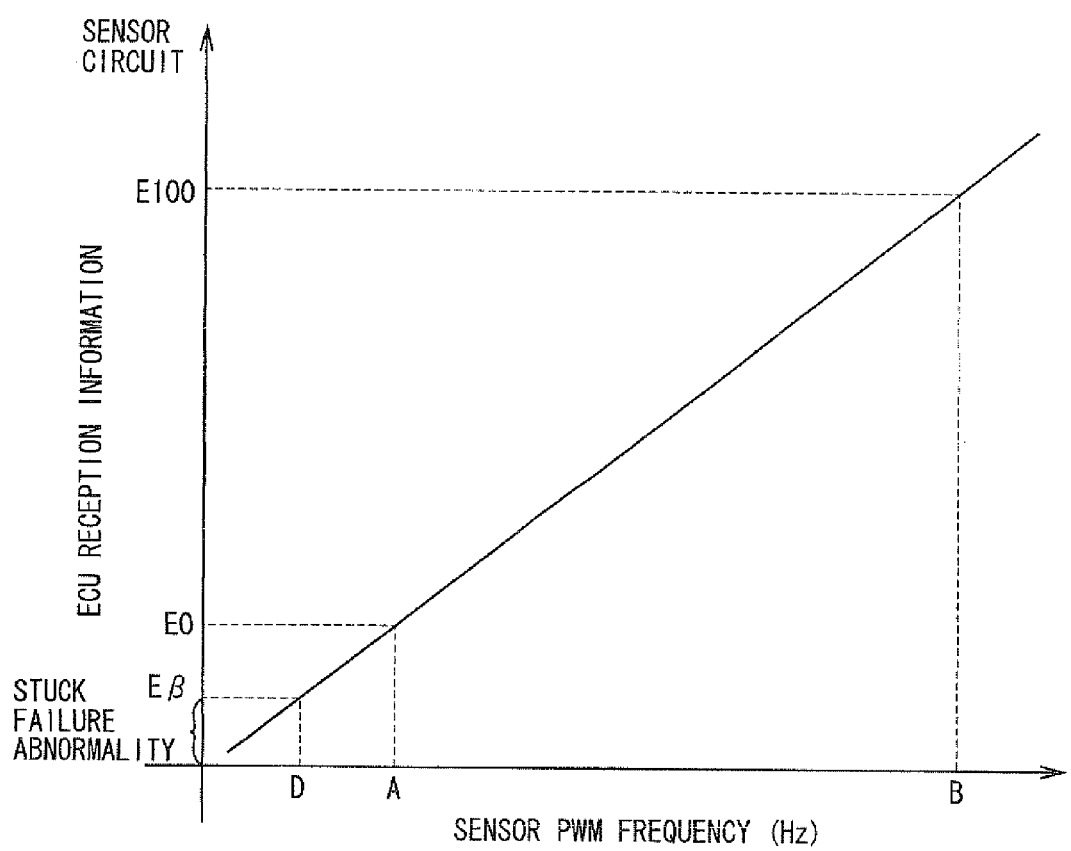
FIG. 20 is a diagram showing the PWM frequency outputted from a microcomputer according to the second embodiment.

Next, the failure determination processing performed by the engine ECU 300 will explained based on a flowchart shown in FIG. 19. In first S500, it is determined whether the ethanol concentration is "equal to or lower than" a predetermined value β (<0). In S500, affirmative determination is provided when the PWM frequency of the PWM signal is equal to or lower than D as shown in FIG. 20. When the ethanol concentration is determined to be equal to or lower than the predetermined value β (S500: YES), the processing shifts to S510. When the ethanol concentration is determined to be higher than the predetermined value β (S500: NO), a timer is reset in S520 and the processing shifts to S540.

In S510, it is determined whether a fixed time has elapsed based on the timer, which is reset in S520. When it is determined that the fixed time has elapsed (S510: YES), the processing shifts to S530. When it is determined that the fixed time has not elapsed (S510: NO), the processing shifts to S540.

In S530, the stuck failure abnormality determination is performed and then the present failure determination processing is ended. In S540, the stuck failure normality determination is performed and then the present failure determination processing is ended. If the engine ECU 300 determines the stuck failure abnormality, the engine ECU 300 may light a warning light of the vehicle or the like to notify the driver of the failure.

Next, effects exerted by the engine control system 1 according to the present embodiment will be explained.

In the engine control system 1 according to the present embodiment, the microcomputer 50 of the alcohol concentration sensor 100 reads the measurement value S(f1) corresponding to the frequency f1 (S400 in FIG. 16) and reads the measurement value S(f2) corresponding to the frequency f2 (S410). Then, the difference |S(f1)−S(f2)| between the two measurement values is calculated (S420). The PWM frequency is calculated from the difference |S(f1)−S(f2)| between the two measurement values (S430), and the PWM signal is outputted (S440). When the difference |S(f1)−S(f2)| between the measurement values falls below the minimum d1, the ethanol concentration is calculated by the extrapolation. The PWM frequency corresponding to the calculated ethanol concentration is calculated (refer to FIGS. 17 and 18). In the engine ECU 300, if it is determined that the state where the ethanol concentration is equal to or lower than the predetermined value β continues based on the PWM signal from the alcohol concentration sensor 100 (S500: YES and S510: YES in FIG. 19), the stuck failure abnormality determination is performed (S530). Thus, the failure of the alcohol concentration sensor 100 itself can be surely determined in the engine control system 1.

Also in the present embodiment, the determination is performed based on the difference |S(f1)−S(f2)| between the measurement values. Therefore, the failure can be determined relatively easily.

Furthermore, in the present embodiment, the abnormality is determined when the difference is equal to or smaller than the predetermined value β smaller than the minimum d1 of the difference |S(f1)−S(f2)| between the measurement values capable of appearing in the case of the normality. That is, the predetermined value β is set to be equal to or smaller than the minimum d1. Accordingly, appropriate determination is realized.

When the fuel is inferior, the leakage resistance in the detection electrodes becomes relatively small. If the leakage resistance decreases, a measurement error of the ethanol concentration increases. Regarding this point, in the present embodiment, the difference |S(f1)−S(f2)| between the measurement values is obtained. Therefore, the constant term including (1/Rp) can be removed, and the influence of the leakage resistance can be eliminated (refer to Expression 5).

Also in the present embodiment, the alcohol concentration sensor 100 constitutes a liquid concentration measuring device. The switches sw1, sw2 constitute switching sections. The oscillation section 20 constitutes an operation signal outputting section. The frequency f1 corresponds to a first frequency. The frequency f2 corresponds to a second frequency. The operational amplifier 43, the resistor 47 and the capacitor 49 constitute a measurement value outputting section. The measurement value S(f1) corresponds to a first measurement value. The measurement value S(f2) corresponds to a second measurement value.

In the present embodiment, the microcomputer 50 constitutes a concentration equivalent value outputting section. The PWM signal outputted by the microcomputer 50 corresponds to a concentration equivalent value. The difference d1 shown in FIG. 17 corresponds to the minimum of the difference between the measurement values capable of appearing in the case of the normality. The air-fuel ratio sensor 200 constitutes an air-fuel ratio sensing section. The engine ECU 300 constitutes a failure determining section, an injection quantity calculating section, an injection controlling section and an abnormality determining section. The air-fuel ratio feedback value corresponds to an air-fuel ratio correction value. The sum of the air-fuel ratio feedback value and the air-fuel ratio learning value corresponds to an injection quantity correction value. The air-fuel ratio sensor 200 and the engine ECU 300 constitute an engine control device.

The sensor output processing shown in FIG. 16 corresponds to processing as a function of the concentration equivalent value outputting section. The failure determination processing shown in FIG. 19 corresponds to processing as a function of the failure determining section.

The present invention is not limited to the above-described embodiments. The present invention may be implemented as follows, for example.

(i) In the above-described embodiments, the two switches sw1, sw2 are used. Alternatively, the present invention can be similarly applied to a construction that uses four switches connected in a so-called crawl-type connection capable of crawl type driving.

(ii) The above-described embodiments are applied to the sensor that measures the ethanol concentration. Also a methanol concentration and the like can be measured with the similar method.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A liquid concentration measuring device comprising:
   detection electrodes arranged to face each other;
   a plurality of switching means for switching charge and discharge of the detection electrodes;
   an operation signal outputting means capable of outputting an operation signal of a first frequency for switching the switching means in a first cycle and an operation signal of a second frequency for switching the switching means in a second cycle;
   a measurement value outputting means that is capable of outputting a voltage corresponding to a capacitance of the detection electrodes as a measurement value and that is capable of outputting a first measurement value due to the first frequency and a second measurement value due to the second frequency; and
   a failure determining means for determining a failure based on both of the first measurement value and the second measurement value outputted by the measurement value outputting means.

2. The liquid concentration measuring device as in claim 1, wherein
   the failure determining means determines the failure based on a measurement difference between the first measurement value and the second measurement value.

3. The liquid concentration measuring device as in claim 2, wherein
   the failure determining means determines that the failure has occurred when the measurement difference falls below a predetermined value that is equal to or smaller than the minimum of the difference between the measurement values capable of appearing in a case of a normality.

4. The liquid concentration measuring device as in claim 1, further comprising:
   a concentration equivalent value outputting means for outputting a concentration equivalent value indicating a concentration of a liquid based on the first measurement value and the second measurement value, wherein
   the concentration equivalent value outputting means outputs a failure value, which indicates the occurrence of the failure, in place of the concentration equivalent value when the failure determining means determines that the failure has occurred.

5. An engine control system comprising:
   a liquid concentration measuring device including at least detection electrodes arranged to face each other,
       a plurality of switching means for switching charge and discharge of the detection electrodes,
       an operation signal outputting means capable of outputting an operation signal of a first frequency for switching the switching means in a first cycle and an operation signal of a second frequency for switching the switching means in a second cycle,
       a measurement value outputting means that is capable of outputting a voltage corresponding to a capacitance of the detection electrodes as a measurement value and that is capable of outputting a first measurement value due to the first frequency and a second measurement value due to the second frequency,
       a concentration equivalent value outputting means for outputting a concentration equivalent value indicating a concentration of a liquid based on the first measurement value and the second measurement value outputted by the measurement value outputting means, and
       a failure determining means for determining a failure based on both of the first measurement value and the second measurement value outputted by the measurement value outputting means; and
   an engine control device including at least
       an air-fuel ratio sensing means for measuring an air-fuel ratio of fuel,
       an injection quantity calculating means for calculating a fuel injection quantity based on an air-fuel ratio correction value calculated based on an output of the air-fuel ratio sensing means and the concentration equivalent value outputted by the concentration equivalent value outputting means, and an injection controlling means for performing fuel injection control based on the fuel injection quantity calculated by the injection quantity calculating means.

6. The engine control system as in claim 5, wherein the failure determining means determines the failure based on a measurement difference between the first measurement value and the second measurement value.

7. The engine control system as in claim 6, wherein the failure determining means determines that the failure has occurred when the measurement difference falls below a predetermined value that is equal to or smaller than the minimum of the difference between the measurement values capable of appearing in a case of a normality.

8. The engine control system as in claim 5, wherein the concentration equivalent value outputting means outputs a failure value, which indicates the occurrence of the failure, in place of the concentration equivalent value when the failure determining means determines that the failure has occurred.

9. The engine control system as in claim 5, wherein when an air-fuel ratio correction value calculated based on the output of the air-fuel ratio sensing means is outside an allowable range, the injection quantity calculating means sets an upper limit or a lower limit of the allowable range as the air-fuel ratio correction value, and the injection quantity calculating means sets the allowable range to be wider than in a case of a normality when the failure determining means determines that the failure has occurred.

10. The engine control system as in claim 9, wherein the injection quantity calculating means sets the allowable range such that a value, which the air-fuel ratio correction value can take when the concentration equivalent value is assumed to be constant, is included in the allowable range when the failure determining means determines that the failure has occurred.

11. The engine control system as in claim 5, wherein the engine control device has an abnormality determining means for determining an abnormality in a fuel system based on deviation of an injection quantity correction value from a normal range, the injection quantity correction value being based on the air-fuel ratio and including an air-fuel ratio correction value calculated based on the output of the air-fuel ratio sensing means, and the abnormality determining means sets the normal range to be wider than in a case of a normality when the failure determining means determines that the failure has occurred.

12. The engine control system as in claim 11, wherein the abnormality determining means sets the normal range such that a value, which the injection quantity correction value can take when the concentration equivalent value is assumed to be constant, is included in the normal range when the failure determining means determines that the failure has occurred.

\* \* \* \* \*